United States Patent [19]

Yamaguchi

[11] Patent Number: 5,054,104
[45] Date of Patent: Oct. 1, 1991

[54] OPTICAL CHARACTER READER

[75] Inventor: Mikio Yamaguchi, Osaka, Japan

[73] Assignee: Sumitomo Electric Industries Ltd., Osaka, Japan

[21] Appl. No.: 504,702

[22] Filed: Apr. 5, 1990

[30] Foreign Application Priority Data

| Feb. 27, 1987 | [JP] | Japan | 62-46295 |
| Feb. 27, 1987 | [JP] | Japan | 62-46296 |
| Feb. 27, 1987 | [JP] | Japan | 62-46297 |
| Feb. 27, 1987 | [JP] | Japan | 62-46298 |

[51] Int. Cl.$^5$ ............................................. G06K 9/22
[52] U.S. Cl. ...................................... 382/57; 382/34; 382/59
[58] Field of Search ....................... 382/65, 59, 58, 48, 382/34, 57

[56] References Cited

U.S. PATENT DOCUMENTS

| 4,136,332 | 1/1979 | Kadota et al. | 382/34 |
| 4,355,301 | 10/1982 | Isshiki et al. | 382/57 |
| 4,797,940 | 1/1989 | Sato et al. | 382/59 |

Primary Examiner—Leo H. Boudreau
Assistant Examiner—Barry Stellrecht
Attorney, Agent, or Firm—Sughrue, Mion, Zinn, Macpeak & Seas

[57] ABSTRACT

A portable optical character reader which is designed to read optical characters, symbols and the like is provided with a unit for recognizing each character within the visual field, a recognition result storing unit for temporarily storing a recognition result, a recognition result comparing unit for comparing a recognition result newly obtained with the content of the recognition result storing unit, and a timer for measuring the time elapsed since a recognition result is obtained. In operation, when the same recognition result has been repeatedly obtained for a period of time which is longer than a predetermined time, this recognition result is output. Accordingly, no recognition result is output when the scanner is moved at excessively high speed, and therefore the operator can read characters by moving the scanner without any fear of erroneous recognition.

3 Claims, 17 Drawing Sheets

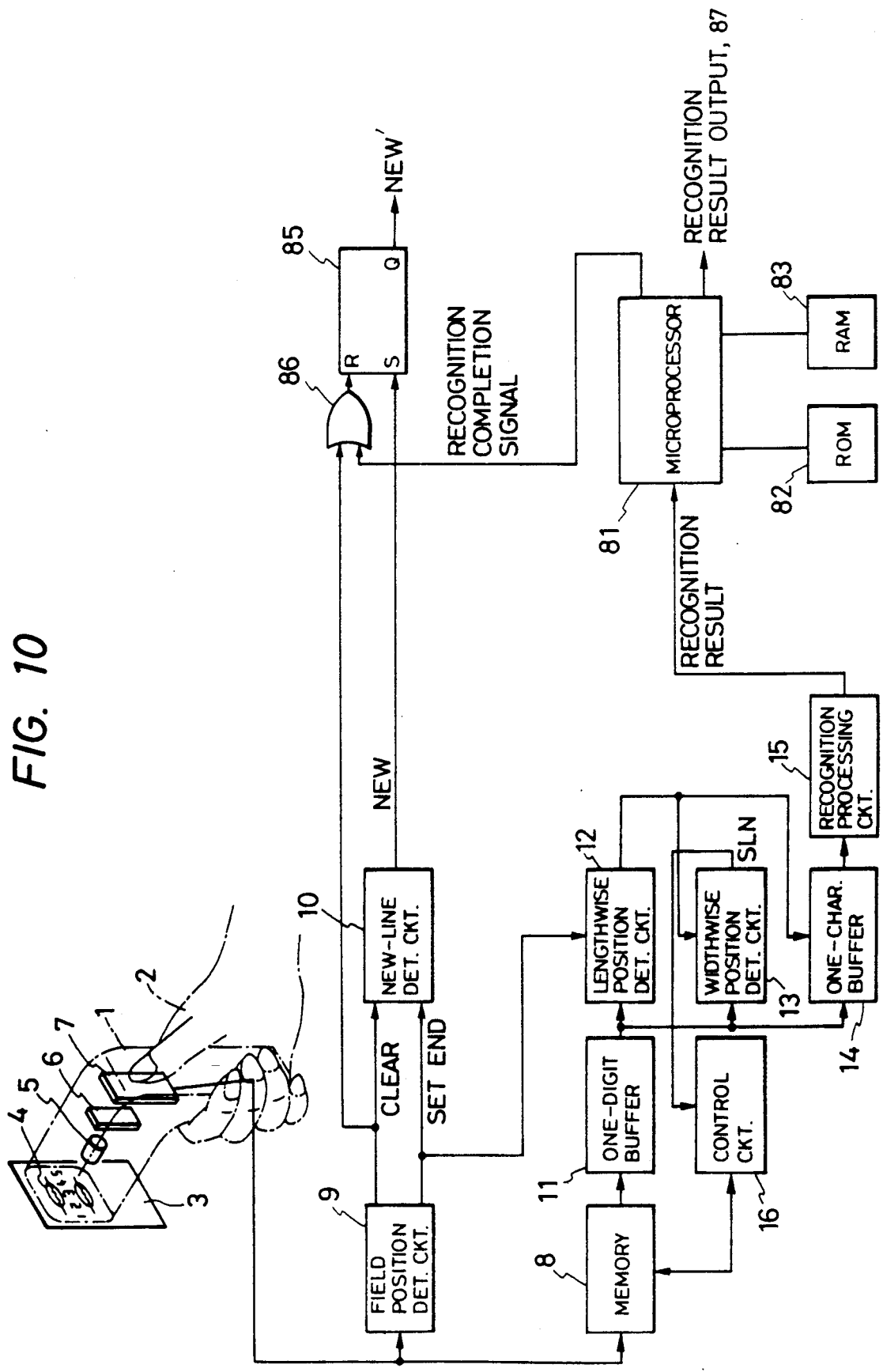

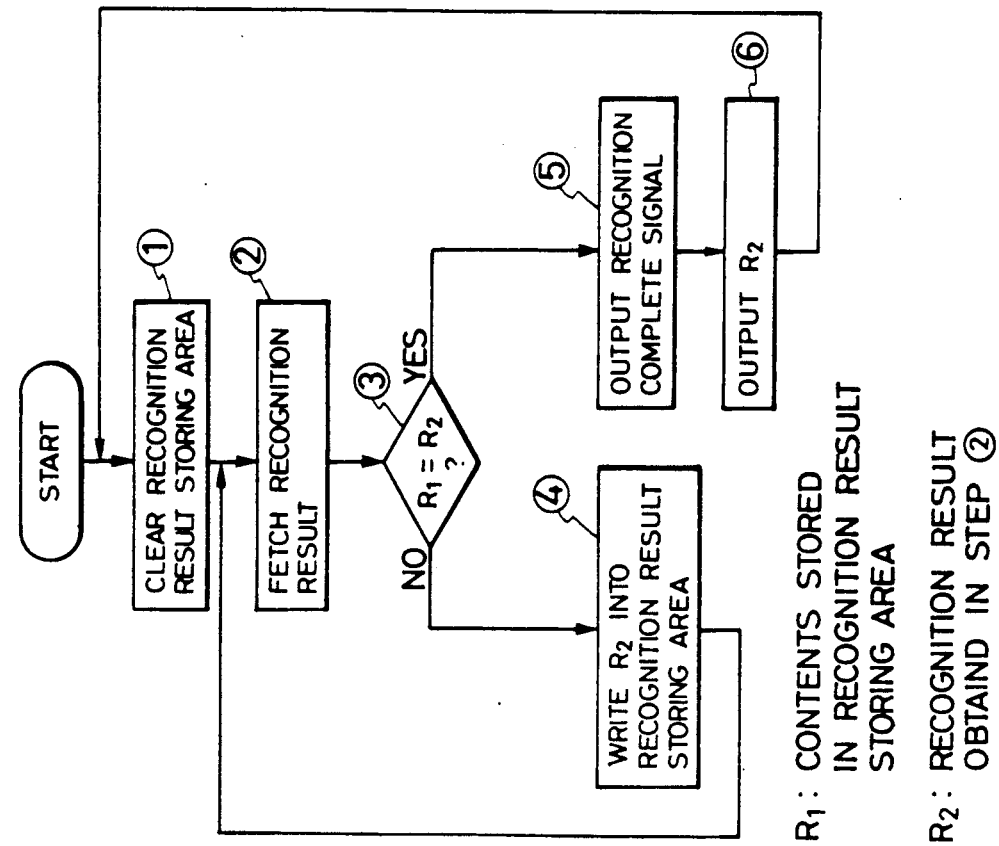

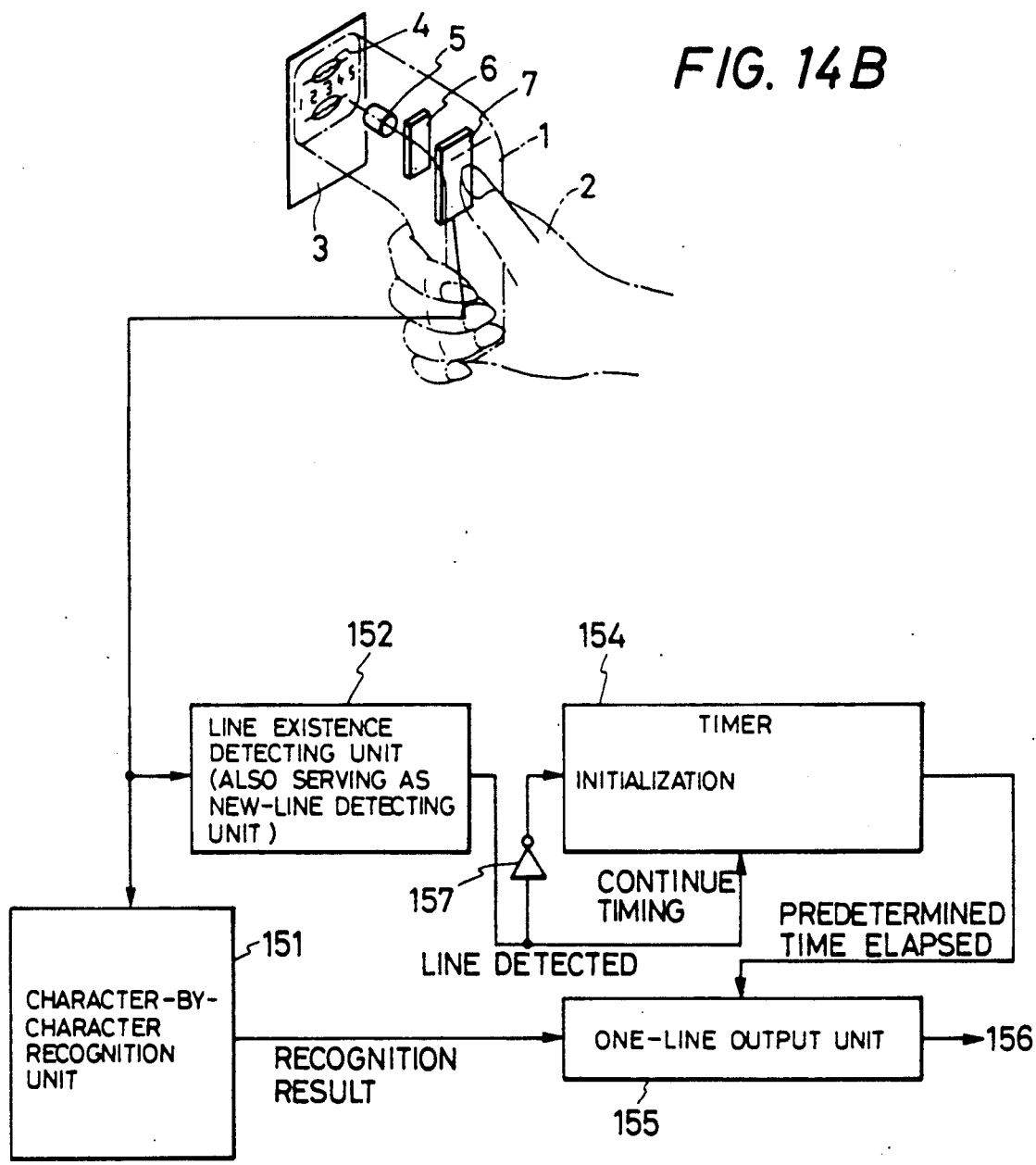

OPTICAL CHARACTER READER

This is a continuation of application Ser. No. 07/161,056, filed Feb. 26, 1988.

BACKGROUND OF THE INVENTION

The present invention relates to an optical character reader designed to read characters, symbols and the like (hereinafter referred to collectively as characters) on a sheet of paper by scanning the sheet with a portable scanner.

POS (Point of Sales) systems have become widely used in which sales data for each individual article is collected and used for inventory control purposes, etc., in supermarkets, department stores and the like. In many cases, portable optical character readers are used in POS systems.

An optical character reader of the same general type to which the invention pertains is described in commonly assigned Japanese Laid-Open Patent Publication No. 61-41474 (1986) and in shown in FIG. 1 herein. In FIG. 1, reference numeral 1 denotes a scanner arranged such that characters recorded on a sheet of paper 3 are read by holding the scanner 1 with the hand 2 and placing it on the sheet 3. The sheet 3 may be, for example, a price tag on which has been recorded information used in the POS system. Reference numeral 4 denotes a light source, 5 a lens system, and 6 an image sensor which is required to have a field of view which corresponds to at least one line of characters recorded on the sheet 3. In the illustrated example, the visual field has a breadth corresponding to about one line of characters and a length corresponding to about three times the length of one character. A control and binary encoding circuit 7 converts the analog output signal for the image sensor 6 into binary-coded signals which correspond to a character region and a background region, respectively, and delivers the binary-coded signals to a memory 8. In the memory 8 are stored binary-coded signals obtained from the entire visual field of the image sensor 6.

Recognition processing is carried out on the basis of the binary-coded signals stored in the memory 8. In the illustrated example, binary-coded signals concerning characters which are correctly contained in the visual field alone are subjected to recognition processing. More specifically, FIG. 2 shows an example of the scanning and binary encoding operation of the scanner 1. In the case illustrated in FIG. 2, characters are correctly contained in the visual field 17. On the other hand, FIG. 3 shows another example in which the sheet 3 is scanned with the image sensor 6 in such a manner that the characters are out of the visual field 17. In such a case, no recognition processing (described below in detail) is carried out. As the scanner 1 is moved, the sheet 3 is scanned with the image sensor 6 again and the output signals of the image sensor 6 are converted into binary-coded signals, which are then stored in the memory 8, thereby increasing the reading speed. It should be noted that, in FIGS. 2 and 3, vertical lines which show boundaries between the picture elements ar partially omitted.

Judgment as to whether or not recognition processing should be carried out is made in a field position detecting circuit 9. More specifically, the field position detecting circuit 9 operates parallel to the operation of storing binary-coded signals in the memory 8, and at substantially the same time as the completion of the storing of the binary-coded signals in the memory 8, the field position detecting circuit 9 judges whether or not recognition processing can be carried out. When it is judged that recognition processing can be carried out, the field position detecting circuit 9 determines a region which is to be subjected to recognition. That is, binary-coded signals for the whole visual field are not processed, and only a region including at least one character is subjected to recognition processing.

An example of the arrangement of the field position detecting circuit 9 is shown in FIG. 4. As illustrated, the field position detecting circuit 9 is inclusive of a row-by-row OR circuit 21 inclusive of an OR gate 23 and a register 24 and a judging circuit 22 composed of a ROM 25 and a register 26.

The row-by-row OR circuit 21 performs an OR operation for each row in that region of the visual field of the image sensor 6 which contains picture element in about a third of the visual field at a substantially central portion thereof in the widthwise direction (i.e., from the column $B_t$ to the column $B_u$ in the region 19 of the visual field 17 shown in FIG. 2). More specifically, when binary-coded signals representing information such as shown in FIG. 2 are delivered from the control and binary encoding circuit 7, binary-coded signals corresponding to the picture elements which are disposed at the respective locations, i.e., from the corner of the row $L_1$ and the column $B_1$ to the corner of the row $L_p$ and the column $B_q$, are successively stored in the memory 8, and, at the same time, the logical sum of the binary-coded signals in each row at a section from the column $B_t$ to the column $B_u$ is obtained in the row-by-row OR circuit 21.

More specifically, when, with the register 24 cleared in advance, the signal corresponding to the picture element at the corner of the row $L_1$ and the column $B_t$ is input to the OR gate 23, the input signal is ORed with the output signal from the register 24, and the result of the OR operation is stored in the register 24. This operation is repeated up to the column $B_u$, and the result of the OR operation for the row $L_1$ is eventually stored in the register 24. When the logical sum of the signals from the column $B_t$ to the column $B_u$ is thus obtained, the content of the register 24 is delivered to the judging circuit 22 and, that the same time, the register 24 is cleared. In this way, the results of OR operations for the rows from the row $L_1$ to the row $L_p$ are successively delivered to the judging circuit 22. From the result of the OR operation performed for each row, it is possible to know whether or not a "dark" binary representation is present in each row.

The following is a description of the arrangement and function of the judging circuit 22, which is supplied with signals representative of the result of the OR operations.

The signal which is representative of the result of the OR operation for each row is input to the ROM 25, and data which is read out from the ROM 25 is stored in the register 26. Since transitions of state which represent changes from light to dark and vice versa have previously been written in the ROM 25 in the form of codes, the light/dark states of the rows up to the row which has just been subjected to the OR operation are stored in the register 26. The signal output from the register 24, which represents the result of the OR operation for the subsequent row, and the signal output from the register 26, which represents the light/dark state of the rows up to the preceding row, are input to the ROM 25 to obtain a signal representative of a new state, which is then stored in the register 26. In the ROM 25 have previously been written codes respectively corresponding to signals SET, END and CLEAR. The signal SET is output when the light/dark state changes from the light state to the dark state, whereas the signal END is output when the light/dark state changes from the dark state t the light state after the light/dark state has been consecutively decided to be dark more than a certain number of times (related to the normal height of the characters). Thus, the character position is detected extending from a row for which the signal SET is output to another row for which the signal END is output. On the other hand, when neither the signal SET nor the signal END is output during the judging operation for the uppermost row $L_1$ to the lowermost row $L_p$, the signal CLEAR is output to a control circuit 16, and the memory 8 is cleared by a signal output from the control circuit 16. Thus, no recognition processing is carried out thereafter, but scanning is effected again to take in new binary-coded signals.

The reason why in the above-described example the logical sum for each row is calculated not for the signals concerning all the columns in the visual field but for the signals only in the central region of the visual field is to minimize the effect of noise which may be generated when the sheet 3 is smaller than the visual field or when a black mark is printed on the sheet 3 outside the region of the characters which are to be read. If the light area of the sheet 3 is sufficiently larger than the visual field, it is possible to calculate a logical sum of the signals concerning all the columns in the visual field.

A new-line detecting circuit 10 determines a character position on the basis of the signals SET and END delivered from the field position detecting circuit 9 and further compares the determined character position with a new character position determined on the basis of the signals SET and END obtained by the subsequent scanning to judge whether or not a new line of characters is present on the basis of the rate of change (the number of picture elements which have changed) in the character position, or on the basis of the fact that the character line has once been output of the visual field 17, which fact is detected from the signal CLEAR. When a new character line is judged to be present, the new-line detecting circuit 10 delivers a signal NEW to a recognition processing circuit 15. After the delivery of the signal NEW, the subsequent recognition processing is carried out.

The new-line detecting circuit 10 makes it possible to read a sheet 3 which carries a larger number of lines of characters than the number of lines which can be continued in the visual field simply by moving the scanner 1 vertically, i.e., either downward or upward. More specifically, since the apparatus is arranged to read characters by placing the scanner 1 on the sheet 3, if the scanner 1 remains stationary on the sheet 3 for a long time, the same portion may be scanned many times to read characters. However, the new-line detecting circuit 10 prevents such an undesirable operation.

The operation of separately recognizing each individual character will next be explained.

Since the binary-coded signals stored in the memory 8 concern all the picture elements in the visual field of the image sensor 6, it is necessary to convert them into a group of binary-coded signals for each character, that is, into data concerning a number of picture element which can be processed in the recognition processing circuit 15 which effects recognition of characters one by one.

The following description will be made on the assumption that the number of picture elements which can be processed in the recognition processing circuit 15 is n in the widthwise direction and m in the lengthwise direction as viewed in FIG. 2.

First, to a one-digit buffer 11 are transferred binary-coded signals concerning picture element within the area $n \times p$, n being the number of picture elements in the widthwise direction and p being the number of picture elements in the lengthwise direction, that is, all of the picture elements contained in one row. In other words, binary-coded signals concerning the picture elements within the area defined between the rows $L_1$, $L_p$ and the columns $B_1$, $B_n$ inclusive are stored in the one-digit buffer 11.

A lengthwise position detecting circuit 12 detects the lengthwise position of one character from the binary-coded signal stored in the one-digit buffer 11 in order to reduce the number of binary-coded signals to the number m of picture elements in the lengthwise direction which can be processed in the recognition processing circuit 15. The lengthwise position of a character is determined in the lengthwise position detecting circuit 12, and m picture elements in the lengthwise direction which can be processed in the recognition processing circuit 15 are chosen (so that the character is located in the substantially central position). Thus, m picture elements in the lengthwise direction are chosen among the binary-coded signals stored in the one-digit buffer 11, and the reduced number of binary-coded signals are transferred to a one-character buffer 14 as data $m \times n$ concerning one character. In the example shown in FIG. 2, binary-coded signals contained in the area defined between the rows $L_1$, $L_m$ and the columns $B_1$, $B_n$ inclusive are transferred to the one-character buffer 14 as being data concerning one character.

A widthwise position detecting circuit 13 determines a widthwise position for binary-coded signals which are to be subsequently stored in the one-digit buffer 11. Each character may be stored in the one-digit buffer 11 by being moved widthwise one picture element position. In such a case, however, the processing time may increase disadvantageously because the same character may be stored many times. Therefore, the widthwise position detecting circuit 13 detects the number of picture elements which are present widthwise between the character concerned and a subsequent character, and the circuit 13 shifts the binary-coded signals by an amount corresponding to the detected number of picture elements to store in the one-digit buffer 11 the binary-coded signals related to the picture elements within the are of $n \times p$.

For example, the content of the one-digit buffer 11 may changed as shown in FIGS. 5A to 5C.

The recognition processing circuit 15 recognizes one character at a time on the basis of the binary-coded data stored in the one-character buffer 14. The circuit 15 may have a known arrangement, for example, that described in Japanese Patent Publication No. 59-6418 (1984). More specifically the recognition processing circuit 15 is adapted to extract characteristic data concerning the character constituting portion for each row or column in vertical and horizontal character areas and to output a result of character recognition which corresponds to the type and appearance sequence of the characteristic data.

When a sheet 3 which carries a larger number of lines of characters than the number of lines which can be contained in the visual field is t be read with the prior-art optical character reader, it suffices to move the scanner 1 vertically, i.e., either downward or upward. However, if the speed of movement of the scanner 1 is excessively high, the image of a character sensed by the image sensor 6 may be blurred and it may be impossible to obtain a correct recognition result. A correct recognition result cannot be obtained either when a character is unreadable or when a character is erroneously read (misrecognition). When a character is unreadable, a "reject" code is output from the recognition processing circuit 15 so that the operator becomes aware of this fact immediately. It is therefore only necessary to place the scanner 1 on the sheet 3 again. In the case of misrecognition, however, even if the sheet 3 carries, for example, the character "7", a code representative of, for example, "1", may be output from the recognition processing circuit 15. Therefore, the operator cannot know whether or not the character "7" has been erroneously recognized simply by observing the recognition result from the recognition processing circuit 15. Accordingly in order to obtain a reliable recognition result, the operator must compare the recognition result output from the recognition processing circuit 15 while moving the scanner 1 to confirm that no misrecognition occurs due to an excessively high speed of movement of the scanner 1. This imposes a heavy load on the operator.

SUMMARY OF THE INVENTION

In view of these circumstances, it is an object of the present invention to provide an optical character reader which is designed so that it is possible to obtain a recognition result only in the case where the speed of movement of the scanner is less than a predetermined value.

It is another object of the present invention to provide an optical character reader which is designed so that it is possible to obtain only correct recognition results by discarding recognition results obtained when the scanner is moved at such a high speed that erroneous recognition is likely to occur.

It is still another object of the present invention to provide an optical character reader which is designed so that it is possible to obtain only correct recognition results by carrying out recognition processing only when the speed of movement of the scanner is within a predetermined range to thereby avoid execution of recognition when the scanner is moved at such a high speed that erroneous recognition is likely to occur.

In according with the above and other objects, according to one aspect of the present invention, there is provided an optical character reader which is arranged to obtain a recognition result only in the case where the speed of movement of the scanner is less than a predetermined value on the basis of the method described below with reference to FIGS. 6A to 6G. For simplification of description, FIG. 6A to 6B show a visual field having a size corresponding to one line of characters. The scanner is assumed to be moved downward.

FIG. 6A shows the size of the visual field 17, the height of the visual field 17 being represented by H. FIG. 6B shows the size of the characters, the height of the characters being represented by h. When the scanner is moved from the upper side to the lower side of the line of characters at a speed V, the period of time T which begins at the time when the line of characters enters the visual field 17 as shown in FIG. 6C and which ends at the time when the line of characters disappears from the visual field 17 is expressed as follows:

$$T = (H - h)/V \tag{1}$$

When the scanner is moved at an upper-limit value $V_{max}$ of the speed of movement, the period of time $T_{min}$ from the time the line of characters enters the visual field 17 to the time the former disappears from the latter is expressed as follows:

$$T_{min} = (H - h)/V_{max} \tag{2}$$

If the condition of $T < T_{min}$ holds, the following condition is also valid from formulas (1) and (2):

$$V < V_{max} \tag{3}$$

When the line of characters is scanned with the scanner being placed at an angle to the line, the substantial height h' of the line of characters is greater than h, i.e., h' > h (see FIG. 6E), and if the scanner is moved at the speed V in this state, the period of time T' which begins at the time the line of characters enters the visual field 17 (as shown in FIG. 6F) and which ends at the time the former disappears from the latter (as shown in FIG. 6G) is expressed as follows:

$$T' = (H - h')/V \tag{4}$$

If the condition of $T' > T_{min}$ holds, the following condition is also valid from formulas (2) and (4):

$$V < V_{max}(H - h')/(H - h) < V_{max} \tag{5}$$

From the above-described relations, it can be understood that the time t elapsed since the line of characters has entered the visual field is measured, and a judgment is made as to whether or not the time t exceeds $T_{min}$ while the line of characters is within the visual field. If YES is the answer, the speed V of movement of the scanner is decided to be less than $V_{min}$.

Thus, the present invention provides an optical character reader which includes processing means which measures the elapsed time t and outputs a recognition result at the time when t exceeds $T_{min}$.

The arrangement of the optical character reader according to the first aspect of the present invention will next be explained with reference to FIG. 7.

Reference numeral 1 denotes a scanner which is applied to a sheet 3 of paper with the hand 2. Reference numeral 4 denote a light source, 5 a lens system, and 6 an image sensor which requires a visual field having a size corresponding to at least one line of characters recorded on the sheet 3. Reference numeral 7 denotes a control and binary encoding circuit which converts analog output signals from photoelectric transducers in the image sensor 6 into binary-coded signals corresponding to character and background regions, respectively. Reference numeral 51 denotes a circuit for recognizing each of the characters contained in the visual field on the basis of the binary-coded signals. Reference numeral 52 denotes a circuit for storing the results of recognition. Reference numeral 53 denotes a circuit for comparing a recognition result $R_1$ stored in the recognition result storing circuit 52 with a new recognition result $R_2$ obtained from the character-by-character recognition circuit 51. When $R_1$ and $R_2$ are not coincident with each other, a timer circuit 54 is initialized. If $R_1$ and $R_2$ are coincident with each other when the timer circuit 54 is counting the elapsed time t and a time-up signal is available because t is in excess of $T_{min}$, a signal OK is transmitted through a gate 55 to a conformable recognition result output circuit 56 which is arranged to output only a corresponding recognition result when the signal OK is available. Reference numeral 57 denotes a unit for delivering a recognition result only once for each line of characters within the visual field as a final output 58. The function of the one-line output circuit 57 may be realized not only by a method wherein recognition results are repeatedly output from the conformable recognition result output circuit 57 and an output 58 is obtained or these recognition results only once for each line of characters, but also by a method wherein the operation of the character-by-character recognition circuit 51 is suspended when a conformable recognition result is obtained from the conformable recognition result output circuit 56, as will be explained below:

In operation, the image of the sheet 3 is taken in by the image sensor 6, and binary-coded signals are obtained by the control and binary-encoding circuit 7. The character-by-character recognition circuit 51 carries out recognition processing on the basis of the binary-coded signals to obtain a recognition result for each of the lines within the visual field. The image sensor 6 repeatedly takes in images to effect recognition processing repeatedly. The recognition results are stored in the recognition result storing unit 52. The content $R_1$ of the recognition result storing unit 52 and a newly obtained recognition result $R_2$ are compared with each other in the recognition result comparing unit 53. The timer 54 measures the period of time during which the same recognition result is being obtained. When $R_1$ is coincident with $R_2$ and the measured time is in excess of a predetermined time, a signal OK is delivered to the conformable recognition result output unit 56. In response to the signal OK, the conformable recognition result output unit 56 outputs the corresponding recognition result. The one-line output circuit 57 outputs a conformable recognition result 58 only once for each line entering the visual field.

According to another aspect to the present invention, the optical character reader can be arranged as shown in FIG. 14A.

Referring to FIG. 14A, the scanner 1 is arranged in the same way as shown in FIG. 7. Reference numeral 151 denotes a unit for recognizing each character contained in the visual field on the basis of the binary-coded signals delivered from the control and binary encoding circuit 7. Reference numeral 152 denotes a unit for judging whether or not a line of characters is present within the visual field on the basis of the binary-coded signals. Reference numeral 153 denotes a unit for judging whether or not a line within the visual field is a new line having entered the visual field for the first time. Reference numeral 154 denotes a timer for measuring the period of time which begins when the new-line detecting unit 153 detects a new line and which continues while the detected new line is being continuously detected by the line existence detecting unit 152. Reference numeral 155 denotes a one-line output unit for outputting a conformable recognition result at the time when the timer unit 154 has finished measuring a predetermined period of time. In practice, the function of the one-line output unit 155 may be realized not only by a method wherein characters in one line are repeatedly recognized in the character-by-character recognition unit 151 and from the recognition results thus obtained a conformable one is output at the time when the timer unit 154 has finished measuring a predetermined period of time, but also by a method wherein, every time the timer unit 154 has finished measuring a predetermined period of time, the character-by-character recognition unit 151 carries out recognition processing only once (as explained in more detail below). Further, although in the arrangement shown in FIG. 14A, the new-line detecting unit 153 causes the timer unit 154 to be initialized when it detects a new line if there is no possibility of a plurality of lines entering the visual field at a time, it is possible to utilize for initialization of the timer unit 154 a signal which negates the signal output from the line existence detecting unit 152 which represents the fact that a line is present within the visual field, that is, it is possible to use for initialization a signal representative of the fact that no line is present within the visual field (see FIG. 14B). In this case, the line existence detecting unit 152 also functions as the new-line detecting unit 153.

In operation, the image of the sheet 3 is received by the image sensor 6, and binary-coded signals are obtained by the control and binary-encoding circuit 7. The line existence detecting unit 152 judges whether or not a line is present within the visual field on the basis of the binary-coded signals. The new-line detecting unit 153 judges whether or not the line which is present within the visual field is a new line. The timer unit 154 measures the period of time which begins when the new-line detecting unit 153 detects a new line and which continues while the detected new line is being continuously detected by the line existence detecting unit 152. When the same line has been continuously present within the visual field for a period of time which is longer than a predetermined time, the recognition result for the line concerned obtained by the character-by-character recognition unit 151 is output from the one-line output unit 155.

Depending on the application of the optical character reader, the present invention may also be used for the following purpose. Namely, it is possible to use the present invention in order to restrict the direction of movement of the scanner to one specific direction when the optical character reader is used to read a sheet of paper which carries a larger number of lines of characters than the number of lines which can be contained in the visual field. In the conventional optical character reader, the lines of characters are sequentially read starting from the line which is first scanned with the scanner and signals are successively output in sequence. Therefore, the sequence in which the lines are read and signals are output when the scanner is moved downward, that is, from the upper side to the lower side of the lines, is different from that in the case where the scanner is moved upward, that is, from the lower side to the upper side of the lines. From the viewpoint of processing the results of reading it is easier to process signals which are output in one specific sequence. In order to enable the lines to be read in one specific sequence, it is necessary to restrict the direction of movement of the scanner in which the scanner is allowed to read to one specific direction and prevent the scanner from reading when it is moved in the reverse direction.

Thus, according to still another aspect of the present invention, the optical character reader is arranged as shown in FIG. 16.

Referring to FIG. 16, the scanner 1 is arranged in the same manner as in the arrangement shown in FIG. 7. Reference numeral 251 denotes a unit for recognizing each character contained in the visual field on the basis of the binary-coded signals delivered form the control and binary encoding circuit 7 and obtaining the position of the recognized character in the visual field (i.e., the character coordinate position). Reference numeral 252 denotes a character coordinate memory for storing the character coordinate position $P_1$ at a time $T_1$ and transferring $P_1$ to a speed judging unit 253 at a time $T_2$ which is different from $T_1$. The speed judging unit 253 compares the character coordinate positions $P_2$ and $P_1$ at $T_2$ to thereby judge whether or not the speed or rate $V_{12}$ of change from $P_1$ to $P_2$ is within a limited range. A conformable speed result selecting unit 254 selectively selects a character recognition result when $V_{12}$ is within the limited range. When $V_{12}$ is out of the limited range, the relevant recognition result is discarded. Reference numeral 255 denotes a unit for delivering an output 256 only once for each line of characters entering the visual field.

In practice, the function of the one-line output unit 255 may be realized not only by a method wherein recognition results are repeatedly output from the conformable speed result selecting unit 254 and an output 256 is obtained from these recognition result only once for each line of characters, but also by a method wherein the operation of the character-by.-character recognition unit 251 is suspended when a conformable recognition result is obtained from the conformable speed result selecting unit 254, as explained below in more detail.

In operation, the image of the sheet 3 is received by the image sensor 6, and binary-coded signals are obtained by the control and binary-encoding circuit 7. Each character within the visual field is recognized by the character-by-character recognition unit 251, and the result of recognition is delivered to the conformable speed result selecting unit 254. The character-by-character recognition unit 251 also obtains the coordinate position of a recognized character and delivers it to both the character coordinate memory 252 and the speed judging unit 253. The above-described processing is repeated a plurality of times. The speed judging unit 253 compares the character coordinate position $P_2$ at the time $T_2$ with the character coordinate position $P_1$ at the time $T_1$ obtained via the character coordinate memory 252 to thereby judge whether or not the rate $V_{12}$ of the change from $P_1$ to $P_2$ is within a limited range. If $V_{12}$ is within the limited range, the speed judging unit 253 delivers a signal OK to the conformable speed result selecting unit 254 to cause it to output the corresponding recognition result. When the signal OK is unavailable form the speed judging unit 253, the conformable speed result select unit 254 discards the recognition result.

Using the above-described processing, it is possible to obtain a conformable recognition result from the conformable speed result selecting unit 254 only when the speed of movement of the scanner is within the limited range. When the scanner is continuously applied to the same line on the sheet 3, the recognition result for the same line is repeatedly obtained, but, by virtue of the function of the one-line output unit 255, a conformable recognition result is obtained in the form of the output 256 only once for each line on the sheet 3.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIGS. 8 and 10 show first and second embodiments, respectively, of the present invention;

FIGS. 9, 11 and 12 are flowcharts showing the processing operations of a microprocessor used in the practice of the invention;

FIGS. 13A to 13C show examples of OCR price tags for POS systems;

FIGS. 14A and 14B show two examples of the arrangement of an optical character reader according to another aspect of the present invention;

DESCRIPTION OF THE PREFERRED EMBODIMENTS

The present invention will be described hereinunder in detail with reference to the accompanying drawings.

Figure 8:
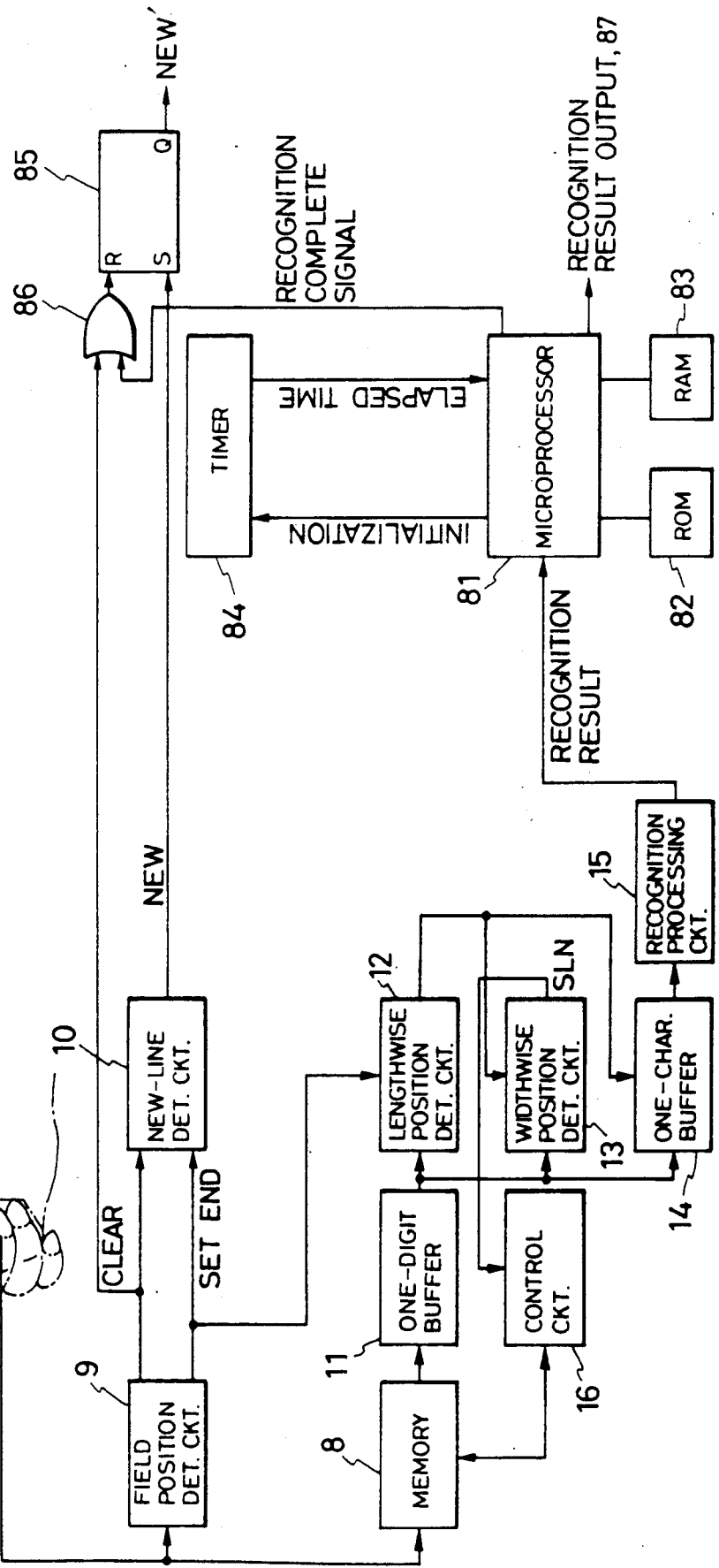

FIG. 8 shows a first embodiment of the present invention in which a microprocessor is employed to obtain a recognition result only when the speed of movement of the scanner is less than a predetermined value, and FIG.

Figure 1:
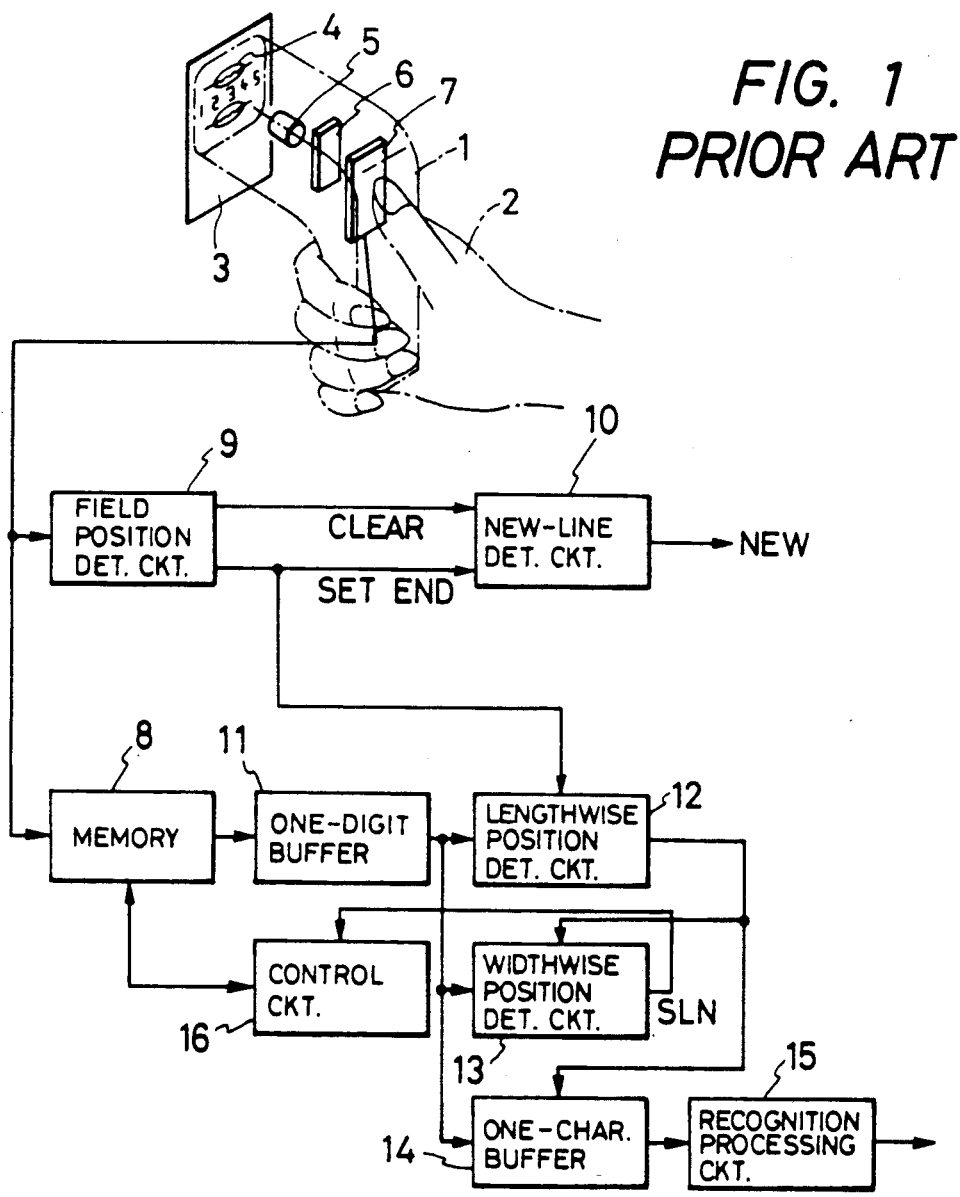
FIG. 1 shows the arrangement of an optical character reader according to the prior art.
Figure 4:
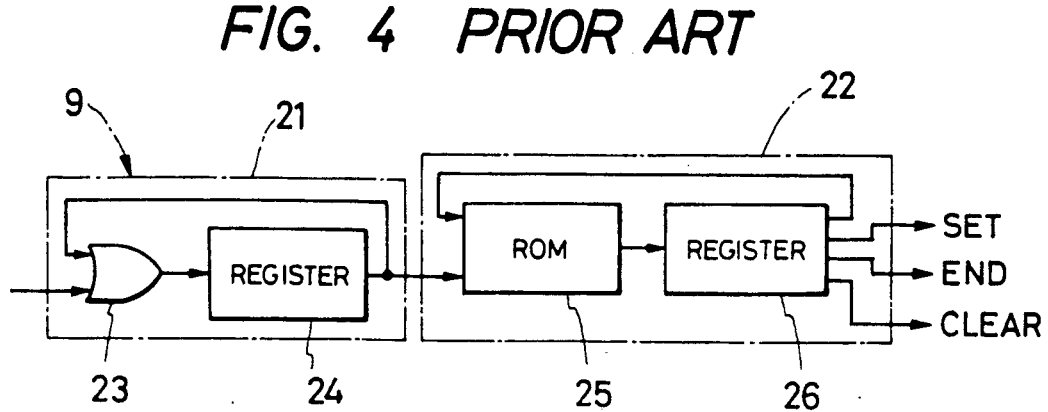
FIG. 4 is a block diagram showing a practical arrangement of a field position detecting circuit.
Figure 2:
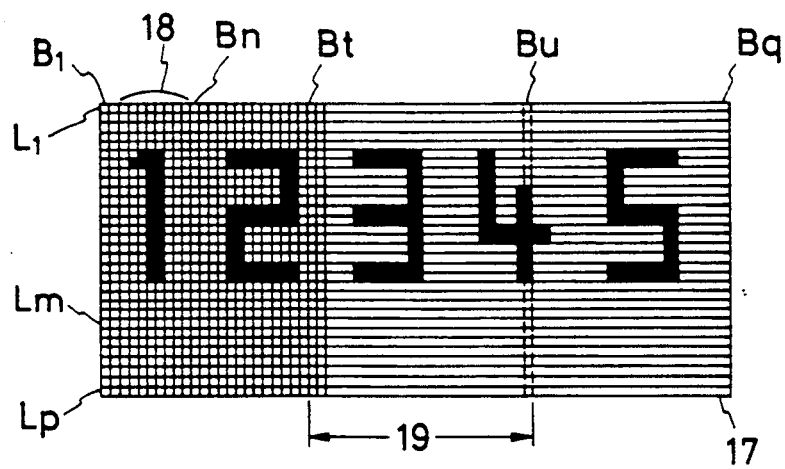
FIGS. 2 and 3 are views each schematically showing the contents of the visual field of the image sensor.
Figure 3:
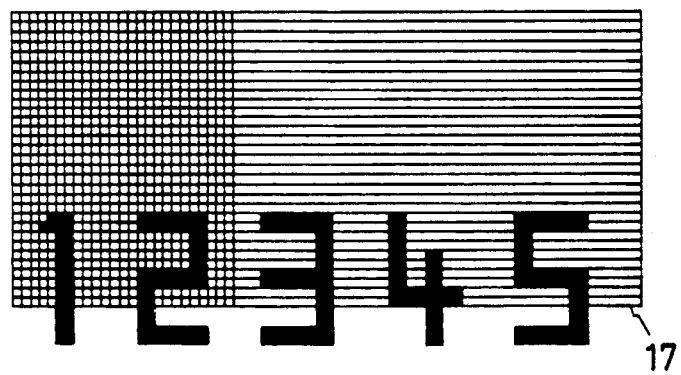
Figure 5A:
FIGS. 5A to 5C are views each schematically showing the contents of a one-character buffer.
Figure 5B:
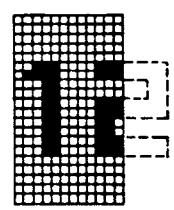
Figure 5C:

9 is a flowchart showing the processing carried out by the microprocessor. In FIG. 8, elements which are denoted by reference numerals 1 to 16 have the same functions and arrangements as those of the corresponding elements of the prior art shown in FIG. 2. However, the circuits 8, 11, 12, 13, 14, 15 and 16 constitute, in combination, an example of the character-by-character recognition unit 51 shown in FIG. 7, which, unlike the prior art example shown in FIG. 1, repeatedly performs recognition of each of the characters in the visual field when a signal NEW' is being output from an RS flip-flop 85.

Figure 7:
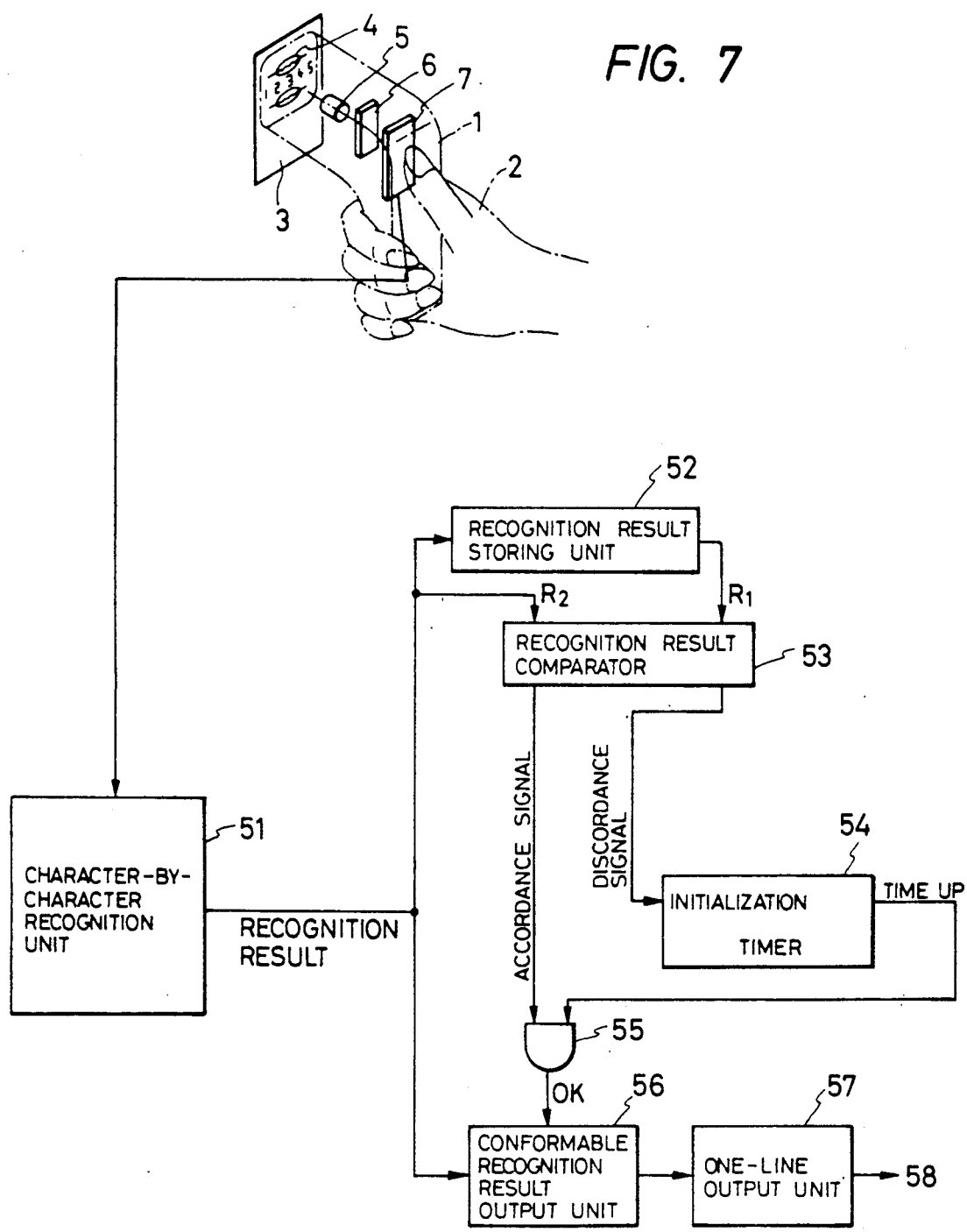
FIG. 7 shows an example of the arrangement of an optical character reader constructed according to one aspect of the present invention.

A microprocessor 81 functions as a combination of the units 52, 53, 55 and 56 shown in FIG. 7. Programs for the microprocessor 81 are stored in a ROM 82. Storage of recognition results for realizing the recognition result storing unit 52 is effected using a RAM 83. A timer 84 is employed for the timer 54 shown in FIG. 7. The microprocessor 81 reads the time elapsed since the timer 84 was initialized in response to a signal output from the microprocessor 81. A gate 86 and an RS flip-flop 85 constitute in combination an example of the one-line output unit 57 shown in FIG. 7.

The process that is carried out when a line of characters enters the visual field proceeds as follows:

The field position detecting circuit 9 first detects that a line of characters is within the visual field. If the detected line is found to be one which has newly entered the visual field, the new-line detecting circuit 10 delivers a signal NEW to the set input of the RS flip-flop 85. When supplied with the signal NEW, the RS flip-flop 85 outputs a signal NEW'. During the period of time when the signal NEW' is available, each of the characters within the visual field is repeatedly recognized by the character-by-character recognition unit composed of the circuits 1 to 16. The signal NEW' is continuously output from the RS flip-flop 85 until the character line concerned disappears from the visual field and consequently a signal CLEAR is transmitted from the field position detecting circuit 9 to the reset input of the RS flip-flop 85 through the gate 86 or until a recognition complete signal is transmitted from the microprocessor 81 to the reset input of the RS flip-flop 85 through the gate 86.

Figure 9:
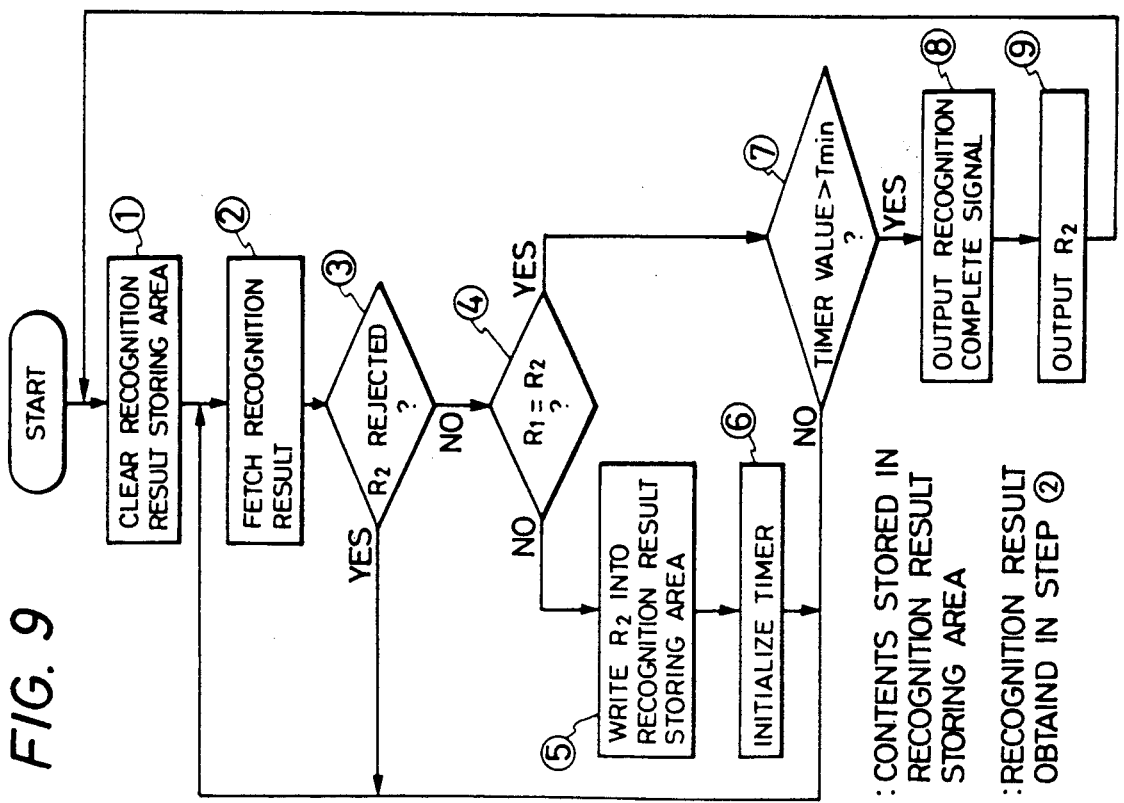

The contents which are to be processed by the microprocessor 81 will next be explained with reference to FIG. 9. First the recognition result storing area is initialized in Step 1. Then, a recognition result is fetched in Step 2. A judgment is made in Step 3 as to whether or not the recognition results involves an unrecognizable (reject) character. If YES, a recognition result is fetched again. The object of the processing carried out in Step 3 is to prevent an unrecognizable character from being output (as output 87 in FIG. 8); if an unrecognizable character may be output, without adverse effect, the processing in Step 3 may be omitted. The recognition result fetched in Step 2 is compared with the content of the recognition result storing area in Step 4. If these two items of data are coincident with each other, the process proceeds to Step 7. In the case where Step 4 is processed for the first time after the processing of Step 1, no data has yet been written in the recognition result storing area; in this case, therefore, the process always proceeds to Step 5, in which the recognition result fetched in Step 2 is written in the recognition result storing area. Then, the timer 84 is initialize in Step 6. After Step 6, the process returns to Step 2, and a recognition result is fetched again. In the case where the process proceeds to Step 7 from Step 4, a judgment is made in Step 7 as to whether or not the timer value is in excess of $T_{min}$ in formula (2). If YES, a recognition completion signal is delivered to the gate 86 to suspend the character-by-character recognition processing carried out by the circuits 11 to 16, and the recognition result fetched in Step 2 is output (as output 87 in FIG. 8) in Step 9. The recognition result storing area provided in the RAM 83 constitutes an example of the recognition result storing unit 52 shown in FIG. 7, as will be clear from foregoing description. The recognition result comparing unit 53 is realized in Step 4.

Figure 6A:
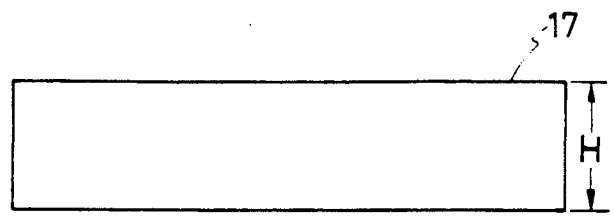
FIGS. 6A to 6G are views showing the relationship between the height H of the visual field and the height h of characters.
Figure 6B:
Figure 6C:
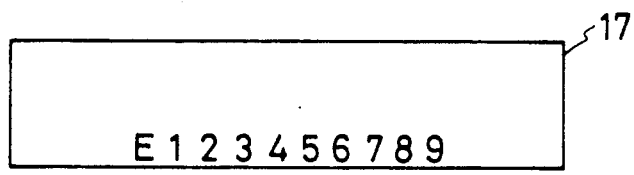
Figure 6D:
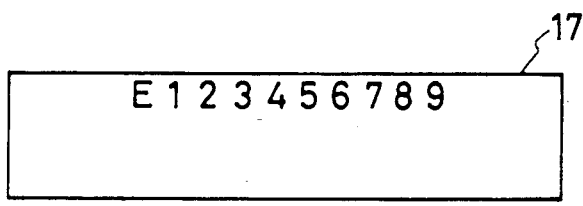
Figure 6E:
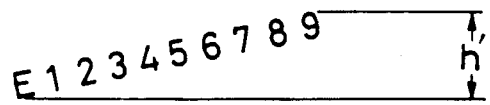
Figure 6F:
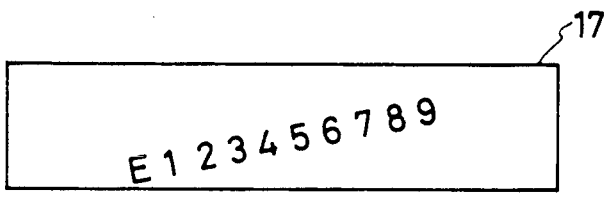
Figure 6G:
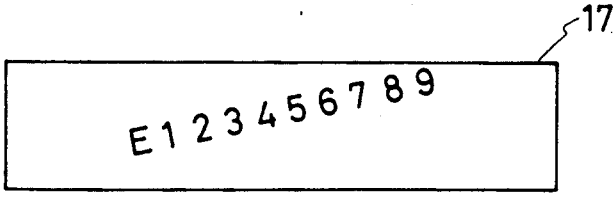

For example, $T_{min}$ can be determined as follows:

It is assumed that the height H of the visual field shown in FIG. 6A is 10 mm and the height h of the characters is 3 mm. Assuming that the upper-limit speed $V_{min}$ in the speed range within which the scanner can be moved is 20 mm/sec, the time $T_{min}$ which must be measured by the counter circuit is expressed as follows:

$$T_{min} = (H - h)/V_{min}$$
$$= 0.35 \text{ sec}$$

Figure 11:
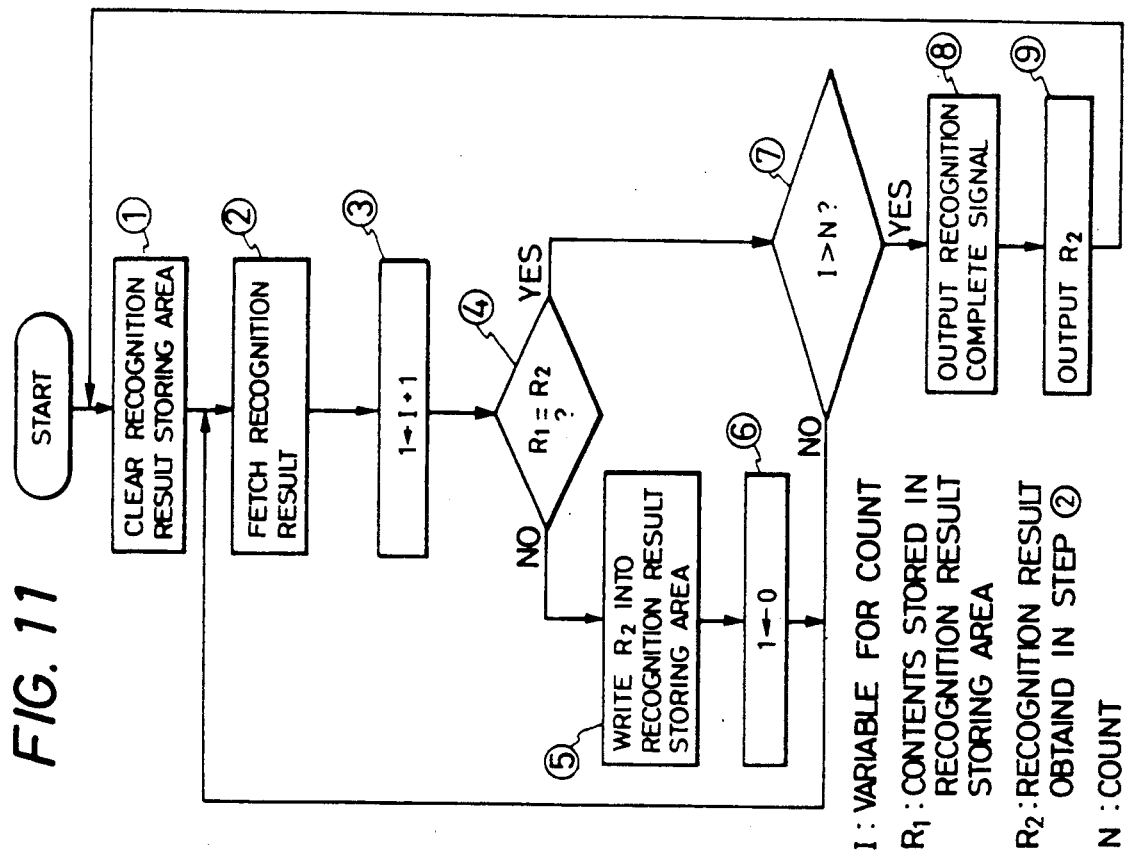

FIG. 10 shows a second embodiment of the present invention in which the elapsed time is measured by counting the number of repetitions of the same recognition result in the microprocessor 81 rather than by measuring it with the timer 84. The processing carried out in the second embodiment will be described with reference to FIG. 11. In the flowchart shown in FIG. 11, Step 3 in FIG. 10 is omitted because in this embodiment an unrecognizable character is also output. Further, in place of the timer 84 in FIG. 8, a variable I for counting is employed, and the number of repetitions of the same recognition result is counted in FIG. 11's Step 3 to thereby measure the time elapsed since the variable I was initialized in Step 6. It is judged in Step 7 whether or not the value of the count variable I is in excess of a predetermined count N in order to make a judgment as to whether or not the time elapsed since the variable I was initialized in Step 6 is in excess of $T_{min}$. The count N is determined as follows:

Assuming that the time required to obtain one recognition result is represented by $T_{cycle}$, the time required to obtain I recognition results is expressed by $T_{cycle} \times I$. The time $T_{cycle} \times I$ exceeds $T_{min}$ if the following condition is valid:

$$T_{cycle} \times I > T_{min}$$

Accordingly, the count N that is employed in Step 7 is expressed as follows:

$$N = T_{min}/T_{cycle}$$

If, for example, $T_{cycle} = 0.07$ sec and $T_{min} = 0.35$ sec, then N = 5.

As a special example, if $T_{cycle} > T_{min}$, then N = 0. If, in this case, the same recognition result is consecutively obtained the condition in which the speed V of movement of the scanner is less than $V_{min}$ is valid. FIG. 12 is a flowchart showing the process executed in this case. Although the function of measuring the elapsed time is not explicitly shown in FIG. 12, a judgment is made in Step 3 as to whether or not the same recognition result has been repeatedly obtained, which processing also enables detection of the fact that the recognition time $T_{cycle} \times I$ is in excess of $T_{min}$. In other words, Step 3 functions as both the recognition result comparing unit 53 and the timer 54.

Finally, the recognition result comparing unit 53 (i.e., Step 4 in FIG. 9, Step 4 in FIG. 10, and Step 3 in FIG. 11) will be explained. It is generally necessary to make a comparison in regard to all characters in a line in order to judge whether or not the same line has been repeatedly recognized. However, in the case of OCR price tags for POS specified according to JIS (Japanese Industrial Standards) such as those exemplarily shown in FIG. 13, the function characters (the top characters in the lines, that is, E, C, N, P, V, X and Y) in the lines on one price tag are different from each other. Therefore, in the case where the optical character reader is used to read data such a these price tags, the recognition result comparing can effect judgment as to whether or not the same line has been repeatedly recognized simply by making a judgment as to whether or not the function characters in the recognized lines are the same.

Thus, according to this embodiment, it is possible to realize an optical character reader which outputs no recognition result when the scanner is moved at an excessively high speed. Accordingly it is unnecessary to confirm each recognition result when the operator moves the scanner at excessively high speed, and it is possible to read characters by moving the scanner without fear of erroneous recognition. Thus it is possible to lighten the load on the operator by a large margin.

Figure 14A:
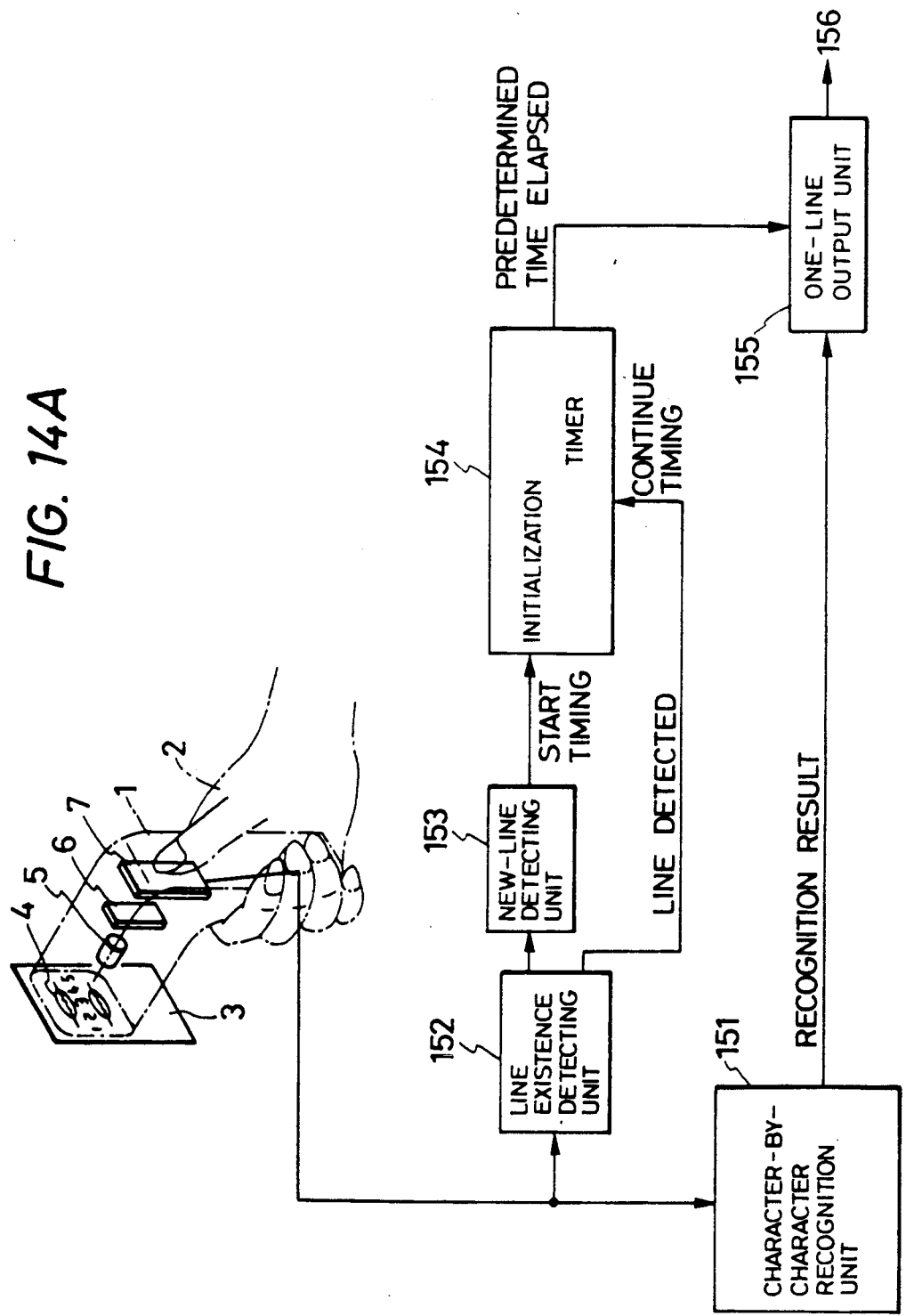
Figure 15:
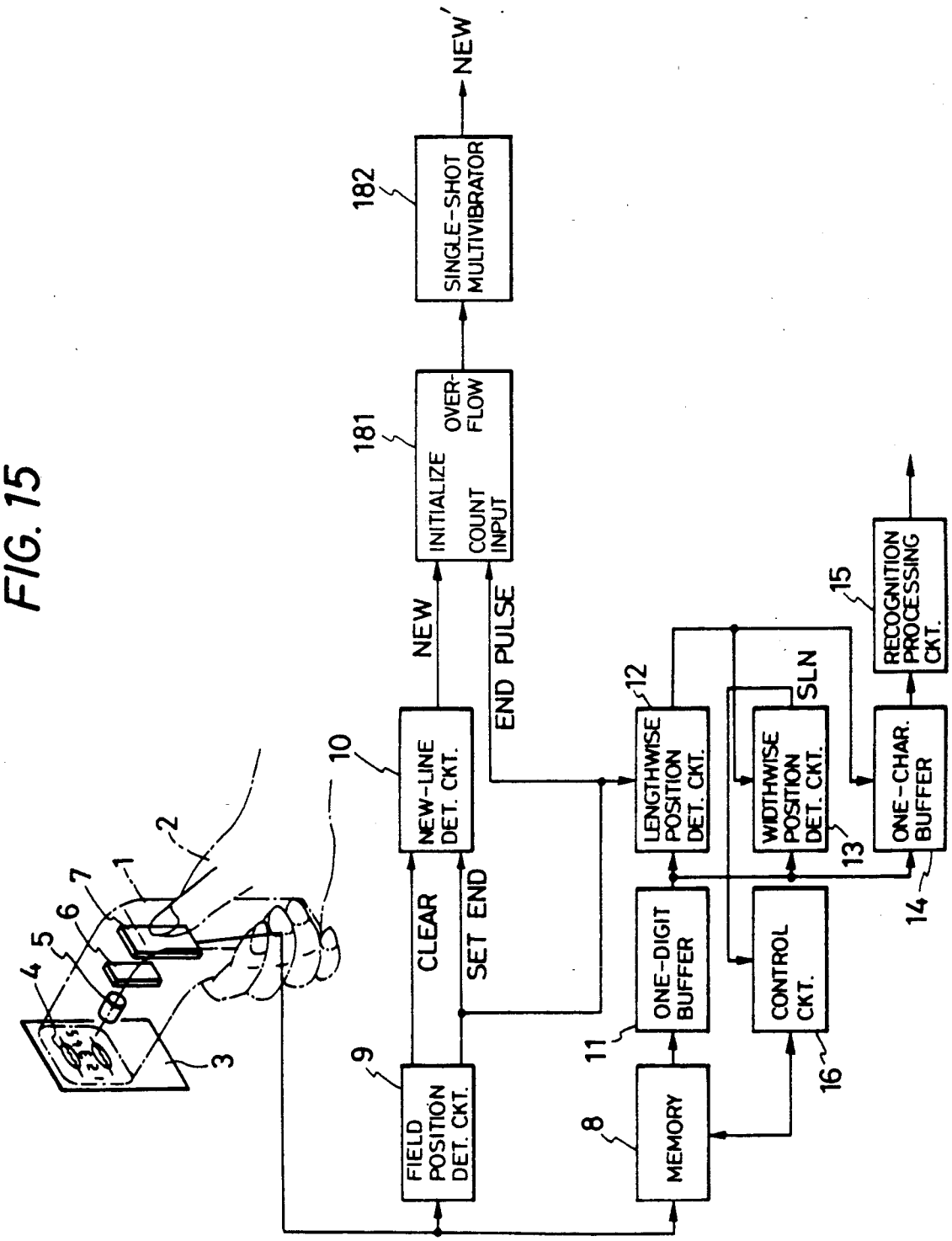
FIG. 15 shows a third embodiment of the present invention.

A third embodiment of the present invention will be described hereinunder with reference to FIG. 15. In this figure, elements which are denoted by reference numerals 1 to 16 have the same function and arrangements as those of the corresponding elements of the prior art shown in FIG. 1. However, the circuits 8, 11, 12, 13, 14, 15 and 16 constitute in combination an example of the character-by-character recognition unit 151 shown in FIG. 14A, which, unlike the prior art arrangement shown in FIG. 1, performs recognition of each of the characters in the visual field in response to a signal NEW' output from a single-shot multivibrator 182. The field position detecting circuit 9 is employed,, for the line existence detecting unit 152 shown in FIG. 14A. Since the circuit 9 is able not only to detect the existence of a line but also to output the position of the detected line in the form of a SET END pulse, it is termed a "field position detecting circuit". The new-line detecting circuit 10 is employed as an example of the new-line detecting unit 153 shown in FIG. 14A. A counter circuit 181 defines the timer 154 shown in FIG. 14A. The counter circuit 181 is initialized in response to a signal NEW output from the new-line detecting circuit 10. When a line is present within the visual field, the image sensor 6 is scanned with respect to the entire visual field, and every time a binary-coded signal is output from the control and binary encoding circuit 7, one END pulse is output from the field position detecting circuit 9. Assuming that it takes, for example, 10 msec to scan the entire visual field, when 35 END pulses are counted in the counter circuit 181, it is known that $10 \times 35 = 350$ msec has elapsed. After being initialized, the counter circuit 181 starts counting the number of END pulses, and when the count reaches a predetermined number of END pulses, an overflow signal is delivered to the single-shot multivibrator 182. Upon receipt of the overflow signal, the single-shot multivibrator 182 generates a signal NEW' having a pulse width adequate to cause the character-by-character recognition unit constituted by the circuits 8, 11, 12, 13, 14, 15 and 16 to carry out recognition processing only once. The character-by-character recognition unit performs recognition of each of the characters in a line present within the visual field and outputs a recognition result accordingly.

The number of END pulses which are to be counted by the counter circuit 181 is determined as follows:

It is assumed that the height H of the visual field shown in FIG. 7A is 10 mm and the height h of characters is 3 mm. Assuming that the upper-limit speed $V_{max}$ in the speed range at which the scanner can be moved is 20 mm/sec, the time $T_{min}$ which must be measured by the counter circuit 181 is obtained from the above described formula (2) and expressed as follows:

$$T_{min} = (H - h)/V_{max}$$
$$= 0.35 \text{ sec}$$

Accordingly, when it takes 10 msec to scan the entire visual field, the number of END pulses which are to be counted in the counter circuit 181 is $0.35/0.01 = 35$.

Thus, according to this embodiment also, it is possible to realize an optical character reader which outputs no recognition result when the scanner is moved at excessively high speeds. Accordingly, it is unnecessary to confirm each recognition result when the operator moves the scanner at an excessively high speed, and it is possible to read characters by moving the scanner without fear of erroneous recognition. Thus, it is again possible to lighten the load on the operator by a large margin.

Figure 16:
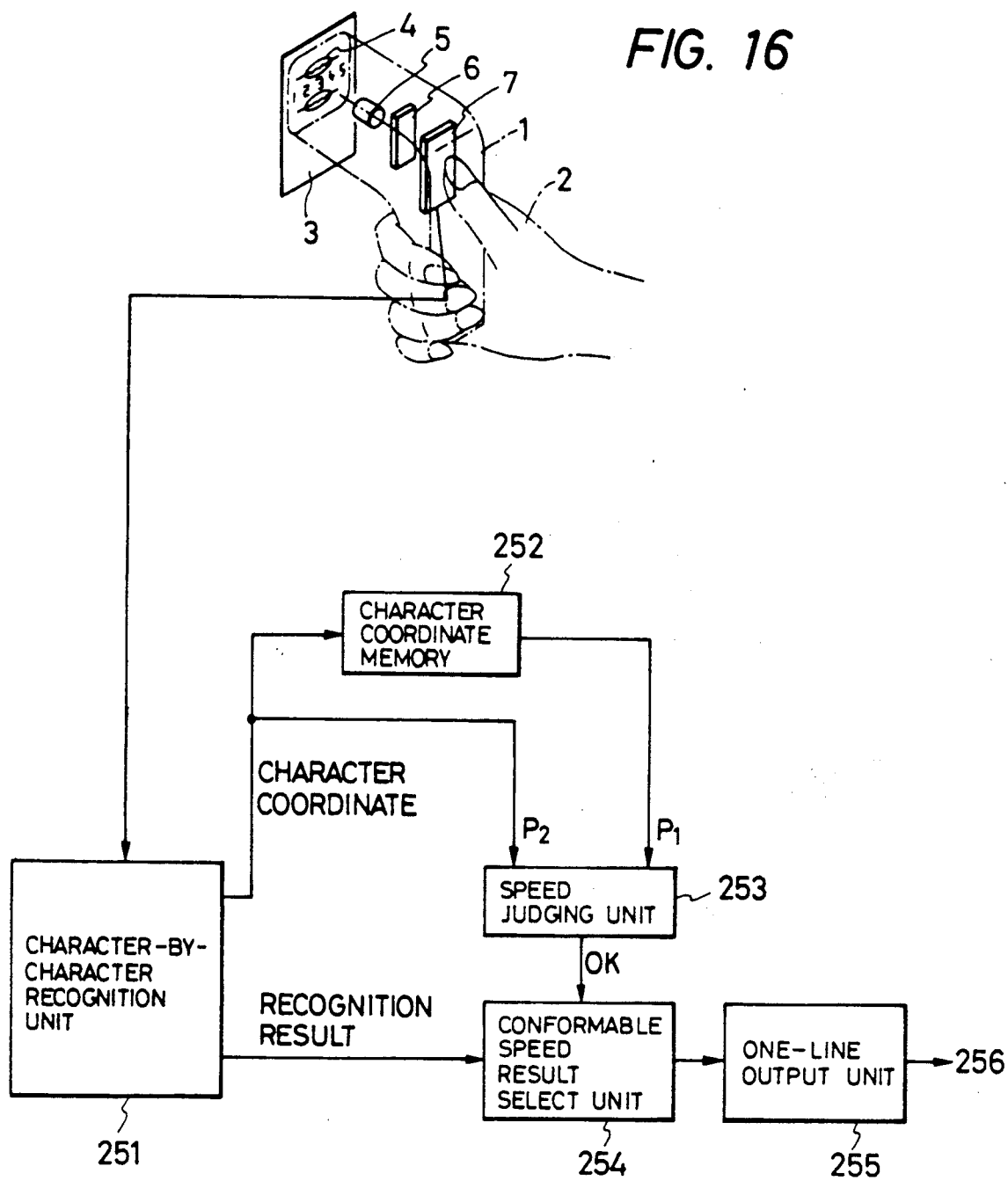
FIG. 16 shows an example of the arrangement of an optical character reader according to still another embodiment of the invention.

A fourth embodiment of the present invention will next be described with reference to FIG. 17. In this figure, elements which are denoted by reference numerals 1 t 16 have the same functions and arrangements as those of the corresponding elements of the prior art shown in FIG. 1. However, the circuits 8, 11, 12, 13, 14, 15 and 16 constitute in combination, an example of the character-by-character recognition unit 251 shown in FIG. 16, which, unlike the prior art arrangement shown in FIG. 1, repeats recognition of each character within the visual field while a signal NEW', which is output from an RS flip-flop 275, is available. It is assumed that the image sensor 6 has a visual field which is relatively long in the widthwise direction, and therefore when the sheet 3 carries a larger number of lines of characters than the number of iines which can be contained within the visual field at a time, the scanner 1 is moved vertically (i.e., in the Y direction) to read the lines of characters. Since, in such a case, the scanner 2 need not be moved horizontally (i.e., in the X direction), in this embodiment the Y coordinates alone of the characters are compared to judge the speed in the speed judging unit 253 also. For this reason, the arrangement is such that the Y coordinates of characters are delivered from the lengthwise position detecting circuit 12 to both a character coordinate memory 271 and a speed judging section 272.

Reference numerals 274 and 275 denote a gate and an RS flip-flop, respectively, which function in combination to output a recognition result only once for each line of characters within the visual field. The operations which are carried out when a character enters the visual field will be explained in sequential order.

When a character enters the visual field, the position of the character is obtained by the field position detecting circuit 9 and the new-line detecting circuit 10 which, upon receiving a signal SET.END from the circuit 9, judges that a new line has entered the visual field and outputs a signal NEW. The signal NEW is transmitted to the set input of the RS flip-flop 275, and a signal NEW' is then output from the flip-flop 275. In response to the signal NEW', each of the circuits 11, 12, 13, 14, 15 and 16 is activated to recognize each character within the visual field on the basis of the binary-coded signals stored in the memory 8. The processing whereby binary-coded signals concerning the entire visual field are stored in the memory 8 to recognize each character is repeatedly carried out while the signal NEW' is available. The Y-coordinate value of each character is delivered for the lengthwise position detecting circuit 12 to both the character coordinate memory 271 and the speed judging section 272. The speed judging section 272 compares the Y-coordinate value $Y_1$ of the character at the time $T_1$ stored in the character coordinate memory 271 with the Y-coordinate value $Y_2$ of the character which is obtained directly from the lengthwise position detecting circuit 12, and outputs a signal OK if the speed or rate $V_{12}$ of change from $Y_1$ to $Y_2$ is within a limited range. In response to the signal OK, a conformable speed result select section 273 outputs the corresponding recognition result. The signal OK is also transmitted to the set input of the RS flip-flop 275 through the OR gate 274. In consequence, the supply of the signal NEW' is suspended to stop the operation of each of the circuits 11, 12, 13, 14, 15 and 16. More specifically, after the recognition result of the line of characters entering the visual field has been output once from the conformable speed result select section 273, the operation of each of the circuits 11, 12, 13, 14, 15 and 16 is suspended; therefore, there is no repetition of the output of the recognition result for the line concerned. The OR gate 274 and the RS flip-flop 275 realize in combination the function of the one-line output unit 255 shown in FIG. 16. In the case where, although a line of characters enters the visual field, the line disappears from the visual field before the signal OK is output from the speed judging section 272 because the scanner is moved at an excessively high speed, a signal CLEAR, which is output from the field position detecting circuit 9, is transmitted to the result input of the RS flip-flop 275 through the OR gate 274. In consequence, the supply of the signal NEW' is suspended to stop the operation of each of the circuits 11, 12, 13, 14, 15 and 16.

The conformable speed result select section 273 may be realized using, for example, a FIFO buffer memory. More specifically, a recognition result delivered from the recognition processing circuit 15 is temporarily stored in the FIFO buffer memory, and, in response to the signal OK from the speed judging section 272, the stored recognition result is output. If no signal OK is output from the speed judging section 272, the FIFO buffer member is reset to erase the contents thereof.

Figure 18:
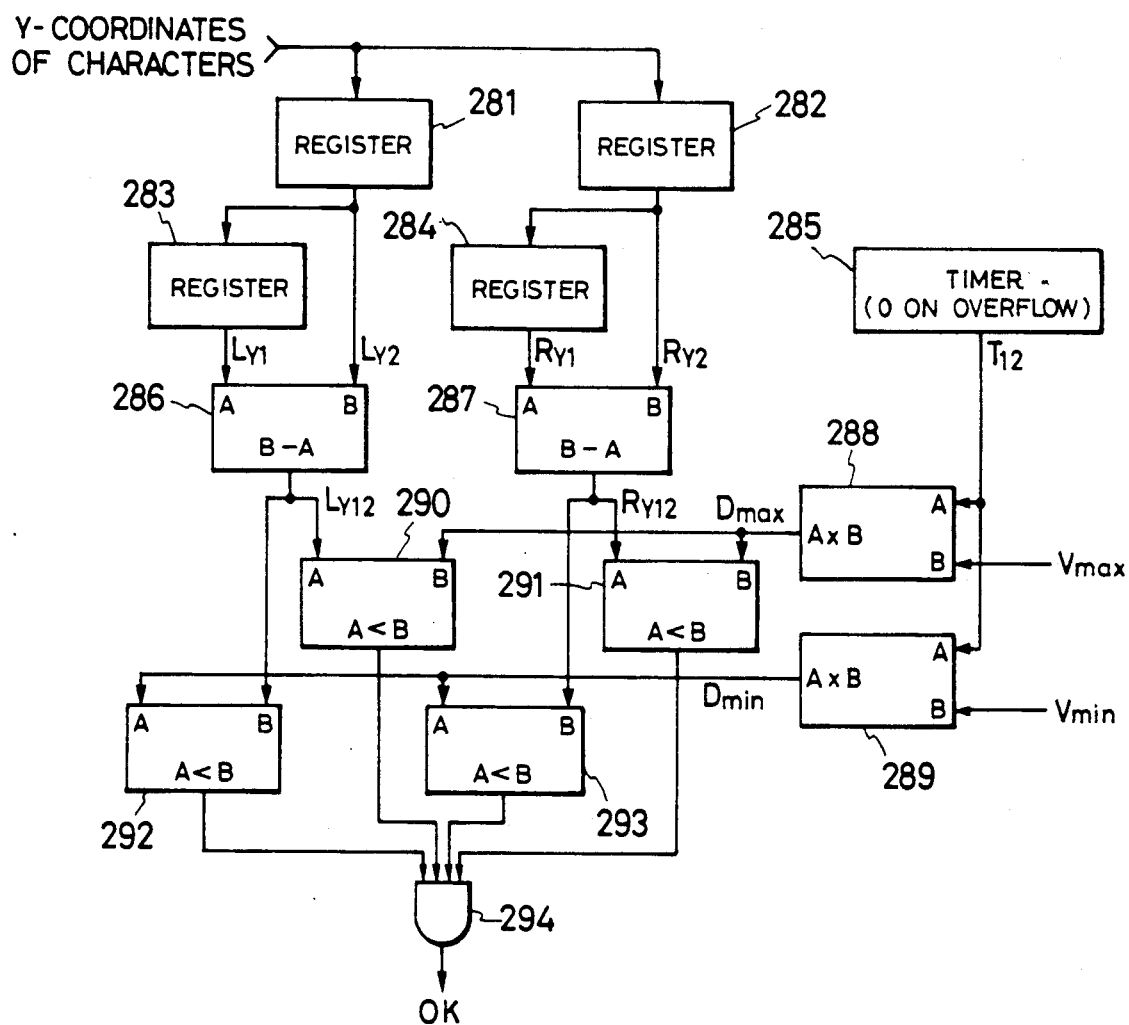
FIG. 18 shows examples of a character coordinate memory and speed judging section according to the fourth embodiment

Examples of the character coordinate memory 271 and the speed judging section 272 are shown in FIG. 18. Although the Y-coordinate value of a character can be obtained for each of the characters within the visual field, in this embodiment the Y-coordinate value $L_Y$ of the character at the left-hand end of the visual field is input to a register 281, while the Y-coordinate value $R_Y$ of the character at the right-hand end is input to a register 282, to thereby carry out processing. Registers 283 and 284 constitute in combination, the character coordinate memory 271, the register 283 being adapted to store the Y-coordinate value of the character at the left-hand end, and the register 284 begin adapted to store the Y-coordinate value of the character at the right-hand end. Circuit elements 285 to 294 constitute in combination, the speed judging section 272. The timer 285 measures the period of time $T_{12}$ which begins at the time when the Y-coordinate values of the characters are written into the registers 283 and 284, respectively, and which ends at the time when the stored coordinate values are employed to judge the speed. When the timer 285 overflows, that is, when $T_{12}$ exceeds $T_{max}$, the timer 285 is initialized to the value 0. Reference numerals 286 and 287 denote subtractors which are employed to obtain the rates of change of the Y-coordinate values. Assuming that the Y-coordinate values stored in the register 283 and 284 are $L_{Y1}$ and $R_{Y1}$ and those in the registers 281 and 282 are $L_{Y2}$ and $R_{Y2}$, respectively, the outputs $L_{Y12}$ and $R_{Y12}$ of the subtractors 286 and 287 are expressed as follows:

$$L_{Y12} = L_{Y2} - L_{Y1}$$

$$R_{Y12} = R_{Y2} - R_{Y1}$$

Assuming that the upper and lower limits of the limited range are $V_{max}$ and $V_{min}$, respectively, and the period of time which begins at the time when the Y-coordinate values are written into the registers 283 and 284 and which ends at the time when the Y-coordinate values of the characters in another field of view are input to the registers 281 and 282 is $T_{12}$, the upper limit $D_{max}$ and the lower limit $D_{min}$ of the limited range for the rates of change of the Y-coordinate values are obtained as follows $$D_{max} = V_{max} \times T_{12}$$

$$D_{min} = V_{min} \times T_{12}$$

Reference numerals 288 and 289 denote multipliers used to obtain $D_{max}$ and $D_{min}$, respectively. Reference numerals 290, 291, 292 and 293 denote comparators for judging whether or not the rates of change of the Y-coordinate values are within the limited range, these comparators judging whether or not the following respective conditions are valid:

$$L_{Y12} < D_{max}$$

$$R_{Y12} < D_{max}$$

$$D_{min} < L_{Y12}$$

$$D_{min} < R_{Y12}$$

When these four inequalities are valid, a signal OK is output from an AND gate 294. After the completion of one judgment processing, the contents of the registers 281 and 282 are copied into the registers 283 and 284, respectively, and the timer 285 is initialized to thereby prepare for subsequent speed judgment processing.

The upper limit $T_{max}$ of the time measured by the timer 285 is set so as to be slightly longer than the time $T_{cycle}$ required for the units 11 to 16 (shown in FIG. 17) to recognize each character to complete recognition of the whole line within the visual field. For example, $T_{max}$ is set so that the following condition is valid:

$T_{cycle} < T_{max} < 2 \times T_{cycle}$

When a line of characters enters the visual field and the recognition of this line is repeated subsequently thereto, the condition of $T_{12} < T_{cycle} < T_{max}$ is valid; therefore, it is possible to carry out the aforedescribed speed judgment processing. When a line enters the visual field, recognition of this line is carried out for the first time, a sufficiently long period of time has passed since the previous recognition; therefore, the time 285 has already overflowed, and the elapsed time, $T_{12}=0$, is output from the timer 285. In this case, the outputs of the multipliers 288 and 289 are as follows:

$D_{max} = D_{min} = 0$

Accordingly, the output of either the comparator 290 or 293 is always false so that no OK signal is output. In other words, the recognition result for a line which has been obtained for the first time since the entry of the line into the visual field is never output from the conformable speed result select section 273.

Although in the foregoing arrangement the speed judgement is made using the Y-coordinate value $L_Y$ of the character at the left-hand end in the visual field and the Y-coordinate value $R_Y$ of the character at the right-hand end, either the rate $L_{Y12}$ of change of the Y-coordinate value of the character at the left-hand end or the rate $R_{Y12}$ of change of the Y-coordinate value of the character at the right-hand end alone may be employed for the judgment of speed in the case where it is expected that there will be no substantial difference between the change rate $L_{Y12}$ and the change rate $R_{Y12}$, that is, in the case where it is expected that the scanner will be moved vertically with its widthwise axis maintained substantially parallel to a line of characters and without any possibility of the scanner being turned.

The following is a description of the upper limit $V_{max}$ and the lower limit $V_{min}$ of the limited speed range in the case where the direction of movement of the scanner 1 in which it is allowed to read characters is restricted to one specific direction (either the downward or upward direction). If the direction of the Y-coordinate axis is set so as to be downward, the rate of change in the Y-coordinate position at the time the scanner is moved downwardly is positive. Accordingly if the direction of movement of the scanner 1 in which it is allowed to read characters is restricted to the downward direction, it suffices to determine the following condition:

$0 \leq V_{min} \leq V_{max}$

That is, the limited range is set so as not to be negative. If, conversely, the direction of movement of the scanner 1 in which it is allowed to read characters is restricted t the upward direction, it suffices to determine the following conditions (i.e., the limited range is set so as not to be positive):

$V_{min} \leq V_{max} \leq 0$

Figure 17:
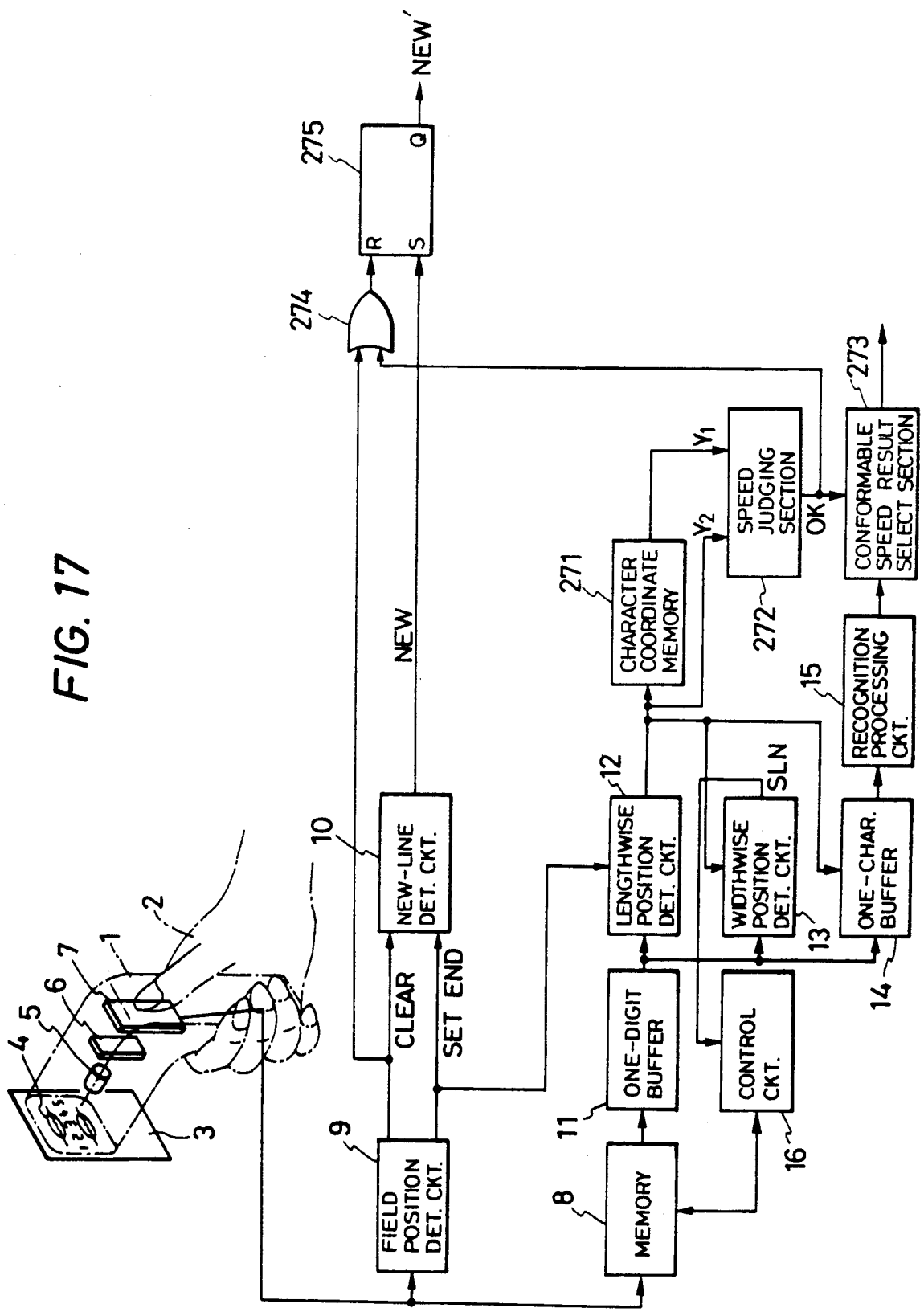
FIG. 17 shows a fourth embodiment of the present invention.

In the embodiment shown in FIG. 17, the judgment of speed is made with respect to the rate of change in the Y-coordinate position alone. This is because the scanner is not moved in the X direction in the use of the optical character reader in accordance with this embodiment. However, it is also possible to apply the present invention to an optical character reader which is used in such a manner that the scanner is also moved in the X direction by further making a judgment of the speed with respect to the rate of change in the X-coordinate position of a character.

Thus, according to this embodiment also it is possible to realize an optical character reader which outputs no recognition result when the scanner is moved at an excessively high speed. Accordingly it is unnecessary to confirm each recognition result when the operator moves the scanner at an excessively high speed, and it is possible to read characters by moving the scanner without fear of erroneous recognition. Thus, as before, it is possible to lighten the load on the operator by a large margin.

In addition, it is possible to realize an optical character reader which is allowed to recognize characters only when the scanner is moved in one specific direction by appropriately setting $V_{min}$ and $V_{max}$. Thus, if the scanner is moved in the reverse direction by mistake, no recognition result is output, and therefore the sequence in which recognition results are successively obtained can be made to be one specific direction. Accordingly it is possible to simplify the processing system that utilizes the recognition results and lower the production cost.

A fifth embodiment of the present invention will next be described with reference to FIGS. 19 to 23.

Figure 19:
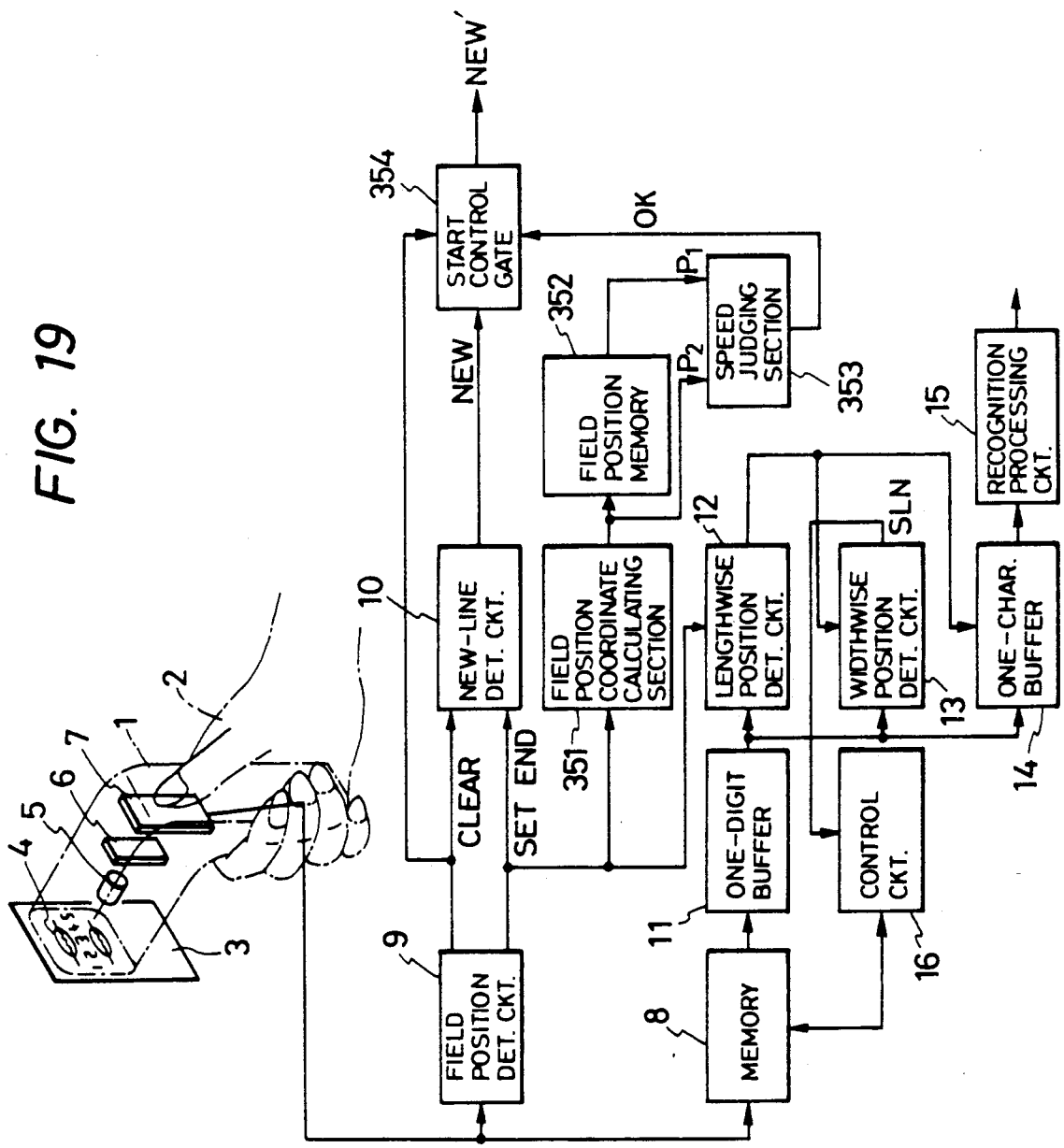
FIG. 19 shows a fifth embodiment of the present invention.

Referring to FIG. 19, the scanner 1 is arranged in the same manner as in the arrangement shown in FIG. 7. Reference numeral 351 denotes a field position coordinate calculating section which converts timing pulses SET END output from the field position detecting circuit 9 into coordinate values so that they are convenient for the subsequent processing. Reference numeral 352 denotes a field position memory which stores a field position $P_1$ at a time $T_1$ until another time $T_2$. Reference numeral 353 denotes a speed judging section which compares the field position $P_1$ output from the field position memory 352 with the field position $P_2$ at the time $T_2$ to thereby judge whether or not the rate $P_{12}$ of change from $P_1$ to $P_2$ is within a predetermined limited range, and if $P_{12}$ is within the limited range, the speed judging section 353 outputs a signal OK. Depending on the way in which the processing operations of the circuits 9, 352 and 353 are realized, the field position coordinate calculating section 351 may be unnecessary. The circuits 8, 11, 12, 13, 14, 15 and 16 constitute in combination, a unit for recognizing each character within the visual field on the basis of the binary-coded signals. Although in FIG. 19 the same character recognition system as explained above is employed, another type of recognition system may be employed. Since the character recognition unit constituted by the circuit 8, 11, 12, 13, 14, 15 and 16 is activated to operate in response to a signal output from the new-line detecting circuit 10, a start control gate 354 is provided to allow the character recognition unit to operate only when the signal OK is being output from the speed judging section 353.

In operation, analog signals which correspond to the image of the sheet 3 ar obtained from the photoelectric transducers in the image sensor 6. The analog signals are converted by the control and binary-encoding circuit 7 into binary-coded signals corresponding to character and background regions, respectively.

By detecting boundaries between the character and background regions on the basis of the binary-coded signals, the general position (hereinafter referred to as the "field position") of a group, e.g., a line of characters, symbols or the like within the visual field, is obtained in the field position detecting circuit 9.

The detected field position is stored in the field position memory 352. If the rate $P_{12}$ of change from the field position $P_1$ at the time $T_1$ to the field position $P_2$ at the time $T_2$ is within a predetermined limited ranged, the speed judging section 353 outputs a signal OK. The recognition start command from the new-line detecting circuit 10 is transmitted to the control circuit 16 through the start control gate 354 only when the signal OK is available, thus causing the character recognition unit constituted by the circuits 8, 11, 12, 13, 14, 15 and 16 to recognize each character within the visual field on the basis of the binary-coded signals and to output a result of recognition.

FIGS. 20 to 23 show examples of elements 351 to 354, respectively. It should be noted that, in this embodiment, Y-coordinate values of the general position of a line of characters, symbols or the like within the visual field alone are handled as field positions.

Figure 20:
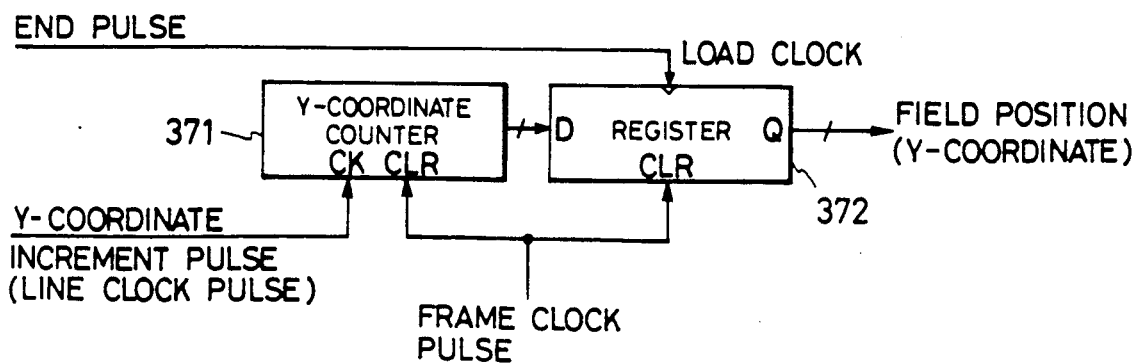
FIG. 20 shows an example of a field position coordinate calculating section according to the fifth embodiment.

Referring to FIG. 20, which shows an example of the field position coordinate calculating section 351, reference numeral 371 denotes a counter for counting Y-coordinate values which are to be processed by the detecting circuit of this embodiment. The counter 371 is initialized to 0 in response to a frame clock pulse which informs the system of start of the processing for one frame. The counter 371 is incremented by one in response to a line clock pulse which informs the system of the end of the processing for one Y-coordinate value. Reference numeral 372 denotes a register which is loaded with the value of the counter 371 in response to an END pulse delivered from the field position detecting circuit 9. Upon the completion of the processing for one frame, if the END pulse is available, the register 372 holds the Y-coordinate value at that time as being a field position value, whereas if no END pulse is available (in the case where no character is within the visual field), the register 372 remains in the initialized state (0) set by the frame clock pulse.

Figure 21:
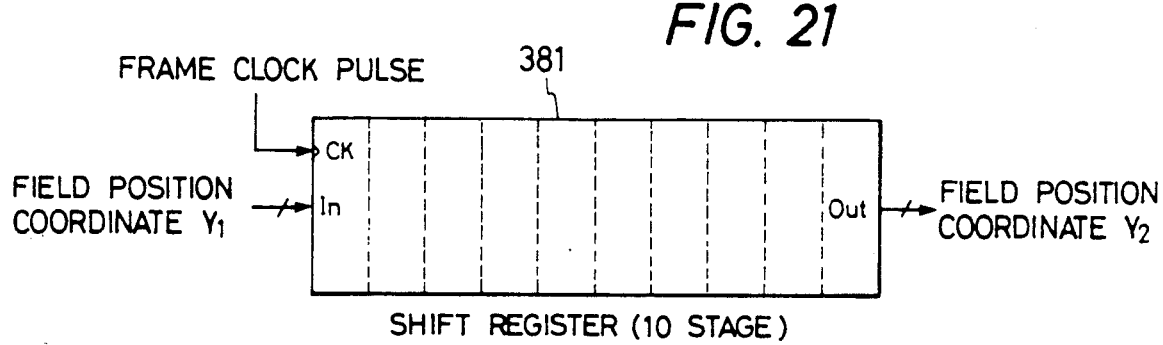
FIG. 21 shows an example of a field position memory according to the fifth embodiment.

FIG. 21 shows an example of the field position memory 352. The memory 352 is realized using a 10-stage shift register 381. A field position coordinate value is input from an input terminal IN and output from an output terminal OUT after 10 frame clock pulses have been received. If, for example, the frame clock pulse signal is generated every 6 msec, the field position coordinate value input from the terminal IN is output from the terminal OUT after 60 msec.

Figure 22:
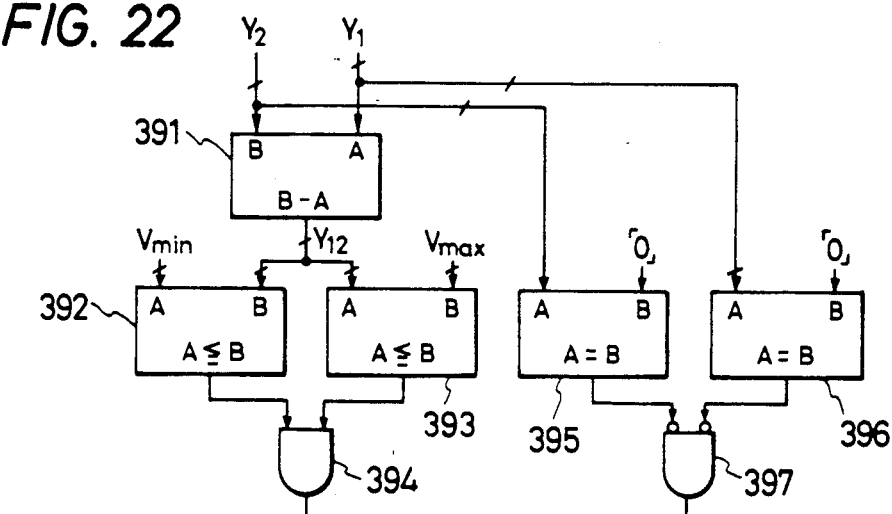
FIG. 22 shows an example of a speed judging section according to the fifth embodiment.

FIG. 22 shows an example of the speed judging section 353. Reference symbol $Y_1$ denotes a field position coordinate value which is output from the output terminal OUT of the field position memory 352, that is, the coordinate value obtained 60 msec before, while $Y_2$ denotes a field position coordinate value input to the input terminal IN of the field position memory 352. The rate $Y_{12}$ of change from $Y_1$ to $Y_2$ is obtained by a subtractor 391, and it is judged whether or not $Y_{12}$ is within a predetermined limit range by a circuit constituted by comparators 392, 393 and a gate 394. More specifically, if the condition of $V_{min} \leq Y_{12}$ is valid, the output of the comparator 392 is true, whereas, if the condition of $Y_{12} \leq Y_{max}$ is valid, the output of the comparator 393 is true, and, when the outputs of both the comparators 392 and 393 are true, the output V_OK of the gate 394 is true. In the case where no character is within the visual field, no END pulse is generated in the field position detecting circuit 9. The values for $Y_1$ and $Y_2$ in such a case are set to 0 by the function of the field position coordinate calculating section 351. The state wherein no character is within the visual field is detected by coincidence comparators 395, 396 and a gate 397. If both the conditions $Y_1 \neq 0$ and $Y_2 \neq 0$ are valid, the output C_OK of the gate 397 is true. If both outputs C_OK and V_OK are true, this indicates that there is a character within the visual field and the rate $Y_{12}$ of change in the field position is within the limited range. At this time, a signal OK is output from a gate 398.

Figure 23:
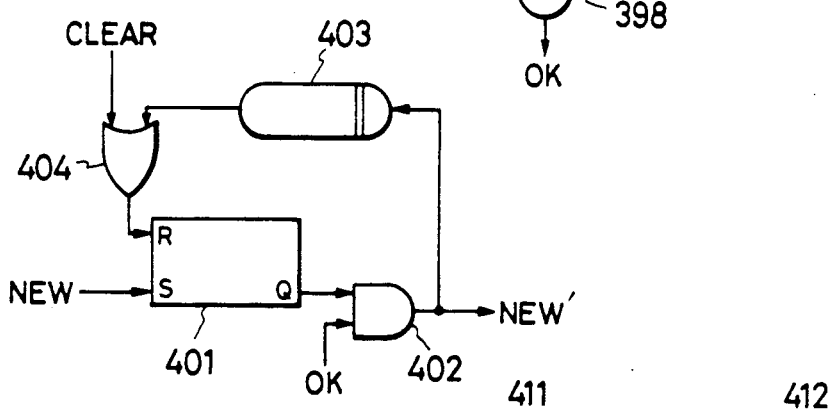
FIG. 23 shows an example of a start control gate according to the fifth embodiment.

FIG. 23 shows an example of the start control gate 354. Reference numeral 401 denotes an RS flip-flop arranged such that the value output from the Q output is true when the signal NEW from the new-line detecting circuit 10 is input thereto. If, thereafter, the signal OK is delivered from the speed judging section 353, the value from the Q output is output as being a signal NEW' by the function of a gate 402. Each of the circuits constituting the unit for recognizing each character within the visual field is activated in response to the signal NEW'. In order to hold the signal NEW' for a predetermined period of time, the signal NEW' is passed through a delay line 403 and a gate 404 to reset the flip-flop 401. When the signal NEW is unavailable, the Q output of the flip-flop 401 is false, and therefore the signal NEW' is not output even if the signal OK is delivered to the gate 402. When a character disappears from the visual field after the signal NEW is delivered and before the signal OK is delivered, the flip-flop 401 is reset by a signal CLEAR output from the field position detecting circuit 9.

With the above-described arrangement of this embodiment, it is possible to recognize each character within the visual field only when the rate $Y_{12}$ of change from the field position $Y_1$ to the field position $Y_2$ is within the limited range.

The following is a description of the upper limit $V_{max}$ and the lower limit $V_{min}$ of the limited speed range in the case where the direction of movement of the scanner 1 in which reading of characters is restricted to one specific direction (either the downward or upward direction). If the direction of the Y-coordinate axis is set so as to be downward, values for $Y_{12}$ obtained when the scanner is moved downward are positive. Accordingly, if the direction of movement of the scanner 1 in which it is allowed to read characters is restricted to the downward direction, it suffices to establish the following condition:

$$0 \leq V_{min} \leq V_{max}$$

That is, the limited range is set so as not to be negative. If, conversely, the direction of movement of the scanner 1 in which it is allowed to read characters is restricted to the upward direction, it suffices to establish the following condition:

$$V_{min} \leq V_{max} \leq 0$$

That is, the limited range is set so as not to be positive.

Figure 24:
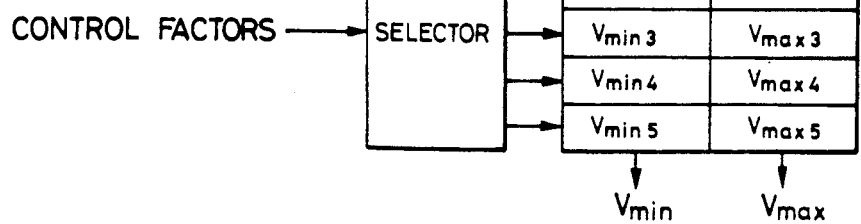
FIG. 24 shows an example of a limited range variable unit according to the fifth embodiment.

FIG. 24 shows an example of a limited range variable unit which may be used to select an appropriate limited range defined by $V_{min}$ and $V_{max}$ in accordance with control factors. An example of the control factors is the density of characters recorded on the sheet 3. When the character density is low, if the scanner 1 is moved even only slightly, a reading error is likely to occur; therefore, $V_{min}$ and $V_{max}$ are preferably set at values close to 0. Conversely, when the character density is high, reading errors do not readily occur even if the scanner 1 is moved somewhat fast. In such a case, therefore, it is preferable to increase the absolute values of $V_{min}$ and $V_{max}$ because, by doing so, it is possible to move the scanner 1 quickly and efficiently. The density of characters can be extracted from the magnitude of analog values output from the photoelectric transducers when the binary encoding circuit detects a character region. Therefore, an appropriate one of the sets of $V_{min}$ and $V_{max}$ shown in a table 412 is selected by a selector 411 on the basis of the analog values and used as $V_{min}$ and $V_{max}$, thus enabling $V_{min}$ and $V_{max}$ to change in an optimal manner.

Figure 25:
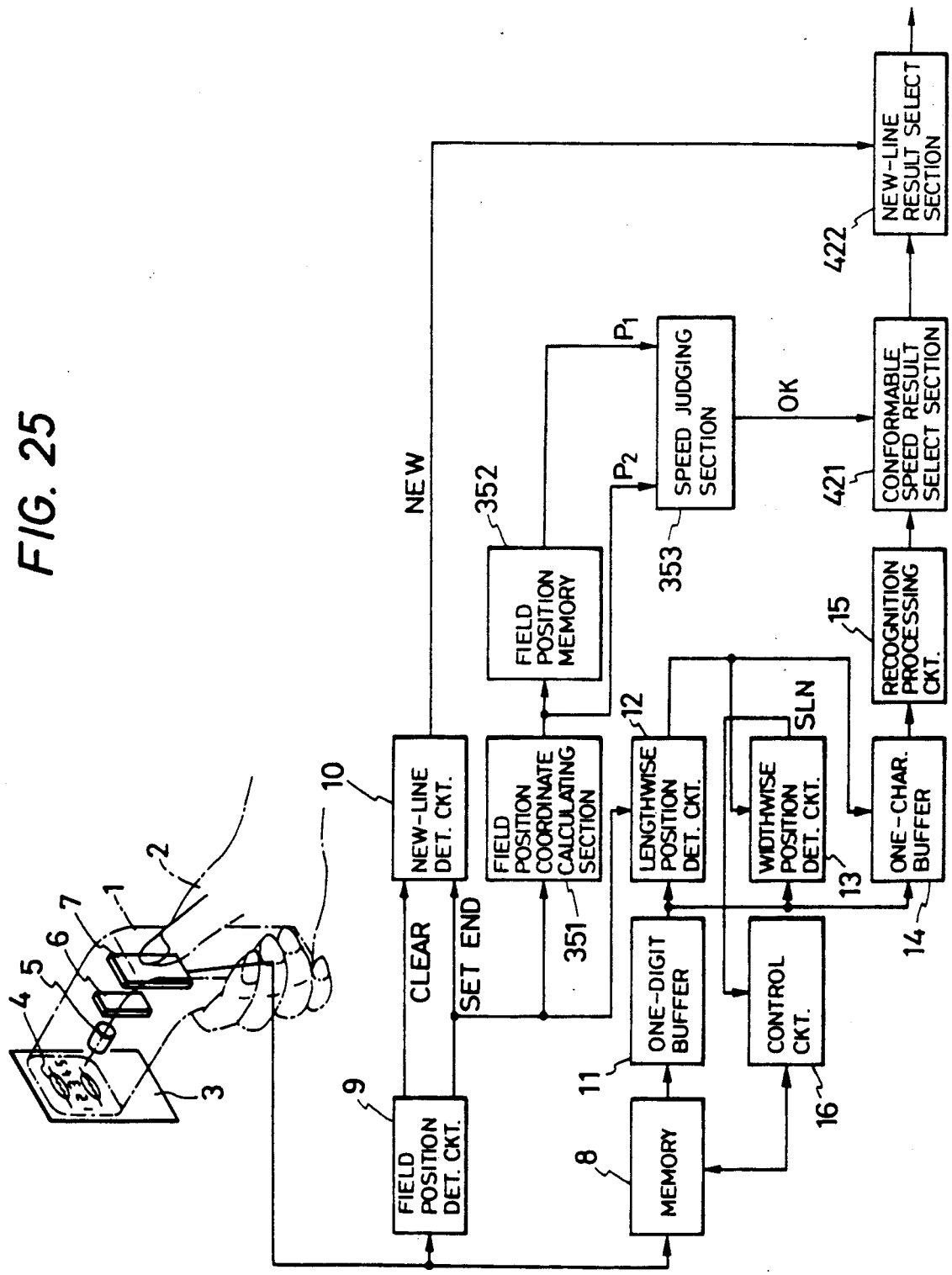
FIG. 25 shows a sixth embodiment of the present invention.

The embodiment shown in FIG. 19 is arranged such that no character is recognized when the signal OK is not output from the speed judging section 353. FIG. 25 shows another embodiment of the optical character reader that is arranged so as not to recognize a character when the signal OK is not output from the speed judging section 353. In FIG. 25, elements which are denoted by the reference numerals 1 to 353 are the same as those denoted by the same reference numerals in FIG. 19. In the arrangement show in FIG. 25, however, the recognition of each character within the visual field which is carried out by the unit is constituted by the circuits 8, 11, 12, 13, 14, 15 and 16 is constantly repeated irrespective of the states of the new-line detecting circuit 10 and the speed judging section 353. The recognition result is repeatedly delivered to a conformable speed results selecting section 421 from the recognition processing circuit 15 at all times. When the signal OK from the speed judging section 353 is available, the conformable speed result selecting section 421 delivers the corresponding recognition result to a new-line result selecting section 422, whereas, when the signal OK is unavailable, the selecting section 421 discards the corresponding recognition result. That the conformable speed result selecting section 421 discards the recognition result in the case where the signal OK is unavailable is equivalent to the fact that no character is recognized when the signal OK is unavailable. When the signal NEW is output from the new-line detecting circuit 10, the new-line result selecting section 422 outputs only once the corresponding recognition result among the recognition results repeatedly output from the conformable speed result selecting section 421, the remaining recognition results being discarded. Thus, in the optical character reader shown in FIG. 25, the recognition result is output only when the signal OK is output from the speed judging section 353 and the signal NEW is output from the new-line detecting circuit 10.

In the embodiments shown in FIGS. 19 and 25, the judgment of speed is made with respect to the rate of change in the field position in the direction Y alone. This is because the scanner 1 is mainly used in such a manner that it is moved vertically in order to read a larger number of lines of characters than the number of lines which can be contained within the visual field. However, it is also possible to apply the present invention to an optical character reader which is used in such a manner that the scanner 1 is also moved in the correction X by obtaining the position of a line in the direction X also in the field position detection circuit 9 and making a judgment in the speed judging section 353 as to whether or not the rate of change in the field position in the direction of X is also within a limited range.

Thus, according to the fifth and sixth embodiments also, it is possible to realize an optical character reader which outputs no recognition result when the scanner is moved at an excessively high speed. Accordingly, it is unnecessary to confirm each recognition result when the operator moves the scanner at an excessively high speed, and it is possible to read characters by moving the scanner without any fear of erroneous recognition. Thus, it is possible to lighten the load on the operator by a large margin.

In addition, it is possible to realize an optical character reader which is allowed to recognize characters only when the scanner is moved in one specific direction by appropriately setting $V_{min}$ and $V_{max}$. Thus, if the scanner is moved in the reverse direction by mistake, no recognition result is output and therefore the sequence in which recognition results are successively obtained ca be determined to be one specific direction. Accordingly, it is possible to simplify the processing system that utilizes the recognition results and lower the production cost.

Although the present invention has been described in specific terms, it should be noted here that the described embodiments are not necessarily exclusive and various changes and modifications may be imparted thereto without departing from the scope of the invention.

What is claimed is:

1. A portable optical character reader for optically reading characters, comprising:
    an image sensor comprising a plurality of photoelectric transducers disposed two dimensionally, said image sensor having a visual field sufficiently wide to encompass a plurality of characters;
    a binary encoding circuit for converting analog signals output from said photoelectric transducers into binary-coded signals corresponding to character and background regions, respectively;
    means for recognizing each character within the visual field on the basis of the binary-coded signals;
    recognition result storing means for temporarily storing a recognition result;
    recognition result comparing means for comparing a recognition result newly obtained with the content of said recognition result storing means;
    timer means for measuring the time elapsed since a recognition result is obtained; and
    means responsive to said timer means for outputting said recognition result when the same recognition result has been repeatedly obtained for a period of time which is longer than a predetermined time.

2. A portable optical character reader for optically reading characters, comprising:
    an image sensor comprising a plurality of photoelectric transducers disposed two-dimensionally, said image sensor having a visual field sufficiently wide to encompass a plurality of characters;
    a binary encoding circuit for converting analog signals output from said photoelectric transducers into binary-coded signals corresponding to character and background regions, respectively;
    line existence detecting means for judging whether or not all the characters constituting one line are entirely contained in the visual field by detecting boundaries between the character and background regions on the basis of the binary-coded signals;
    new-line detecting means for detecting when a new line has entered the visual field;

timer means for measuring the time elapsed since a new line is detected by said new-line detecting means;

means for recognizing each of the characters within the visual field on the basis of the binary-coded signals; and means responsive to said timer means for outputting said recognition result when the same line has been continuously detected by said line existence detecting means for a period of time longer than a predetermined time since said line is detected as being a new line by said new-line detecting means.

3. The optical character reader according to claim 2, wherein said line existence detecting means comprises:

means for ORing binary-coded signals indicative of the character region in the widthwise direction of the visual field; and means for detecting that the results of said OR operation are the same in succession over a predetermined distance in the lengthwise direction of the visual field.

* * * * *